United States Patent
Watanabe et al.

(10) Patent No.: US 11,403,738 B2
(45) Date of Patent: Aug. 2, 2022

(54) DISPLAY DEVICE COMPRISING AN IMAGE ANALYSIS UNIT, AND IMAGE CALCULATION PROCESSING UNIT

(71) Applicant: SEMICONDUCTOR ENERGY LABORATORY CO., LTD., Atsugi (JP)

(72) Inventors: Kazunori Watanabe, Tokyo (JP); Koji Kusunoki, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 222 days.

(21) Appl. No.: 16/636,555

(22) PCT Filed: Aug. 1, 2018

(86) PCT No.: PCT/IB2018/055758
§ 371 (c)(1),
(2) Date: Feb. 4, 2020

(87) PCT Pub. No.: WO2019/030615
PCT Pub. Date: Feb. 14, 2019

(65) Prior Publication Data
US 2021/0158489 A1    May 27, 2021

(30) Foreign Application Priority Data
Aug. 11, 2017  (JP) .............................. JP2017-156231

(51) Int. Cl.
*G06T 5/00*      (2006.01)
*G06T 5/50*      (2006.01)
(Continued)

(52) U.S. Cl.
CPC ................ *G06T 5/003* (2013.01); *G06T 5/50* (2013.01); *G09G 3/32* (2013.01); *G09G 3/36* (2013.01);
(Continued)

(58) Field of Classification Search
CPC . G06T 5/003; G06T 5/50; G06T 2207/20084; G09G 3/32; G09G 2340/0407; G09G 3/36–3696
See application file for complete search history.

(56) References Cited

U.S. PATENT DOCUMENTS

| | | | | |
|---|---|---|---|---|
| 2011/0043526 A1* | 2/2011 | Shiomi | ................ | H04N 7/0125 345/428 |
| 2012/0050811 A1* | 3/2012 | Koike | ....................... | G06T 1/60 358/1.16 |
| 2014/0307971 A1* | 10/2014 | Hanzawa | .............. | G06T 3/4053 382/195 |

FOREIGN PATENT DOCUMENTS

| | | |
|---|---|---|
| JP | 2002-057993 A | 2/2002 |
| JP | 2002-199349 A | 7/2002 |

(Continued)

OTHER PUBLICATIONS

International Search Report (Application No. PCT/IB2018/055758) dated Nov. 13, 2018.
(Continued)

*Primary Examiner* — Roy P Rabindranath
(74) *Attorney, Agent, or Firm* — Nixon Peabody LLP; Jeffrey L. Costellia

(57) ABSTRACT

A display device having a high display quality is provided. The display device is formed such that for each target block that is to be displayed, different super-resolution processing are applied. Specifically, an image analysis unit analyzes image data that is input, and a target block within an image to be displayed is specified. In the image analysis unit, data (Continued)

of the target block is analyzed using a learned neural network, and an image dividing unit is controlled to divide the image data according to the analysis results. In the image analysis unit, in order to perform different super processing that applies to each image data that has been divided according to the analysis results, an image calculation processing unit including a plurality of super-resolution processing circuits is controlled.

16 Claims, 14 Drawing Sheets

(51) Int. Cl.
*G09G 3/32* (2016.01)
*G09G 3/36* (2006.01)

(52) U.S. Cl.
CPC .............. *G06T 2207/20084* (2013.01); *G09G 2340/0407* (2013.01)

(56) References Cited

FOREIGN PATENT DOCUMENTS

| | | |
|---|---|---|
| JP | 2006-011999 A | 1/2006 |
| JP | 2009-100112 A | 5/2009 |
| JP | 2014-077993 A | 5/2014 |
| JP | 2015-222470 A | 12/2015 |

OTHER PUBLICATIONS

Written Opinion (Application No. PCT/IB2018/055758) dated Nov. 13, 2018.

\* cited by examiner

FIG. 6A
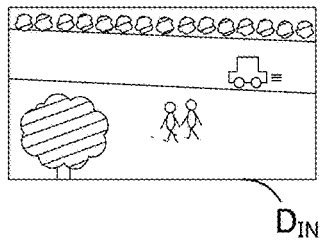
$D_{IN}$
FIG. 6B
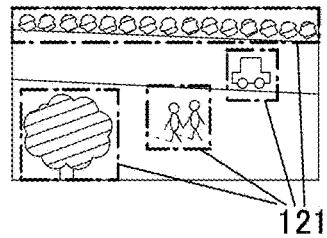
121
FIG. 6C1
$D_{DIV\_1}$
FIG. 6C2
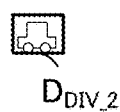
$D_{DIV\_2}$
FIG. 6C3
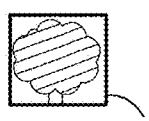
$D_{DIV\_3}$
FIG. 6C4
$D_{DIV\_4}$
FIG. 6C5
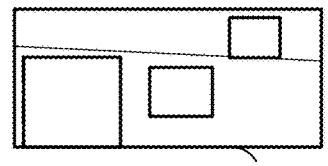
$D_{DIV\_5}$
FIG. 6D
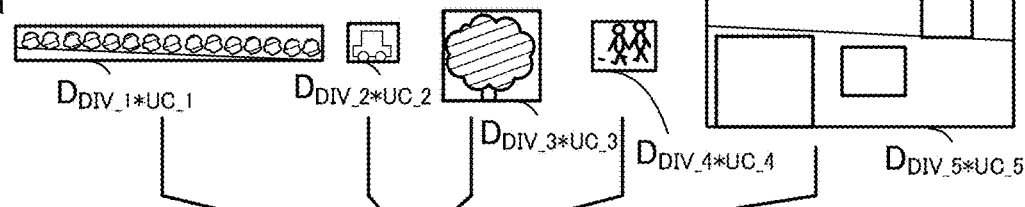
Divided image data: $D_{DIV\_1}$, $D_{DIV\_2}$, $D_{DIV\_3}$, $D_{DIV\_4}$, $D_{DIV\_5}$
117_1, 117_2, 117_3, 117_4, 117_5
Upconverted image data: $D_{DIV\_1*UC\_1}$, $D_{DIV\_2*UC\_2}$, $D_{DIV\_3*UC\_3}$, $D_{DIV\_4*UC\_4}$, $D_{DIV\_5*UC\_5}$
Synthesized image data
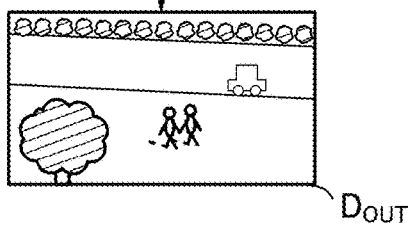
$D_{OUT}$

FIG. 7

| Group | Algorithm | Quality | Processing speed |
|---|---|---|---|
| A | Nearest neighbor | Lowest | Fast ↑<br><br>↕<br><br>↓ Slow |
| A | Bilinear | Low | |
| A | Bicubic | Average | |
| B | RAISR | High | |
| B | ANR | High | |
| B | A+ | Higher | |
| C | SRCNN | Highest | |

FIG. 11A1
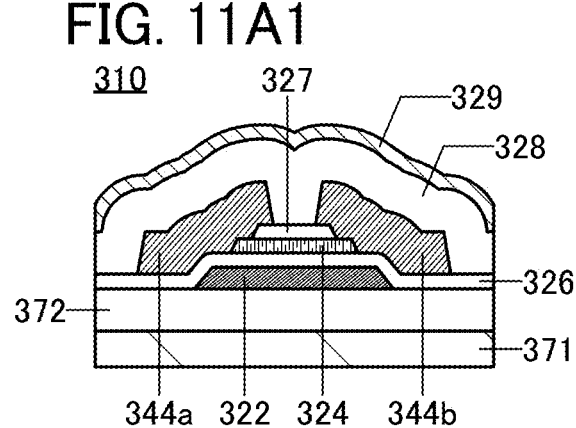
FIG. 11A2
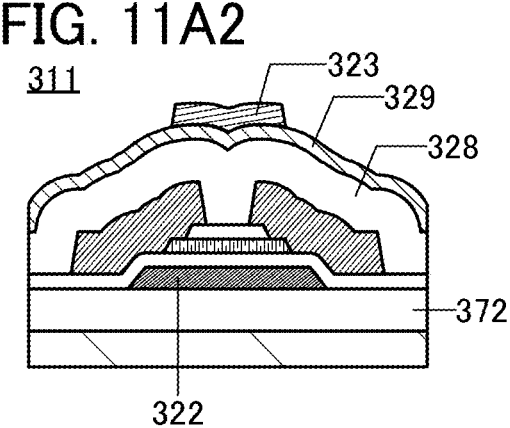
FIG. 11B1
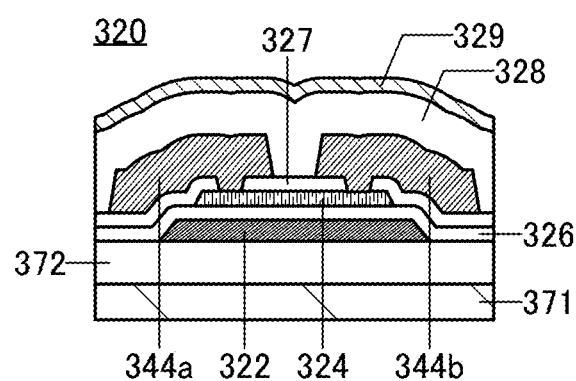
FIG. 11B2
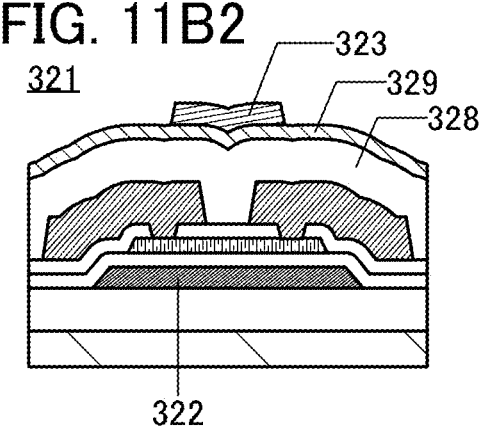
FIG. 11C1
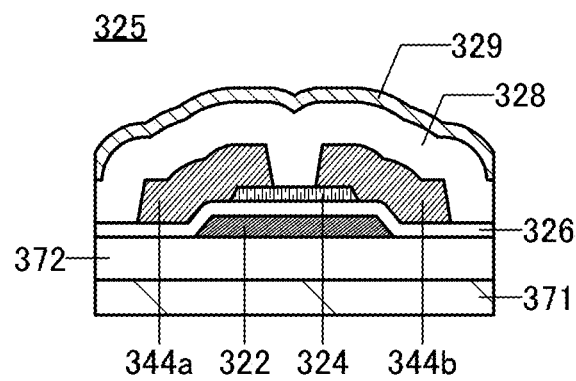
FIG. 11C2
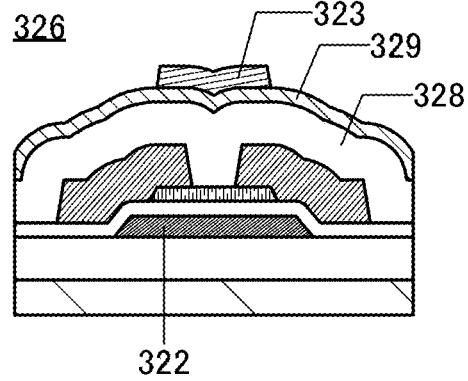

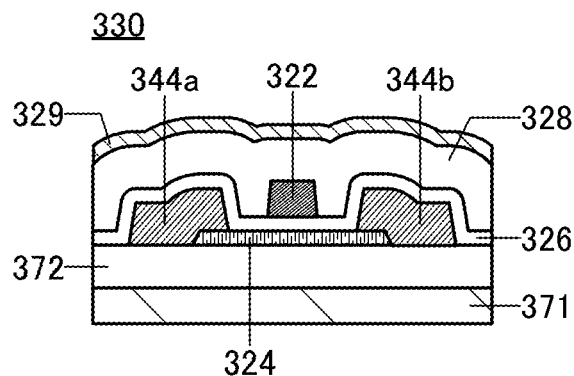
FIG. 12A1
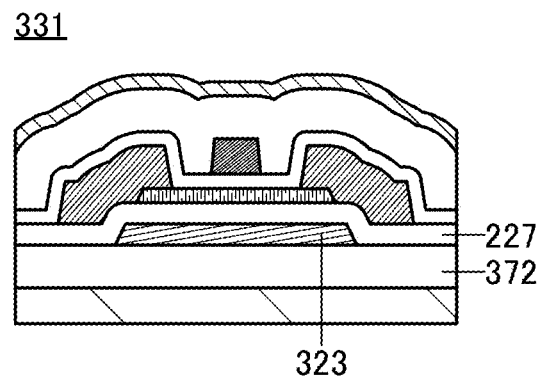
FIG. 12A2
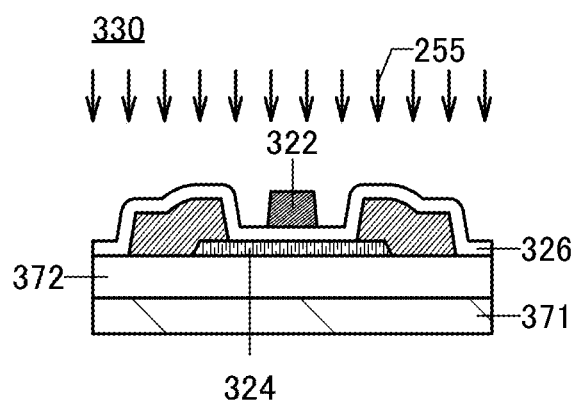
FIG. 12A3
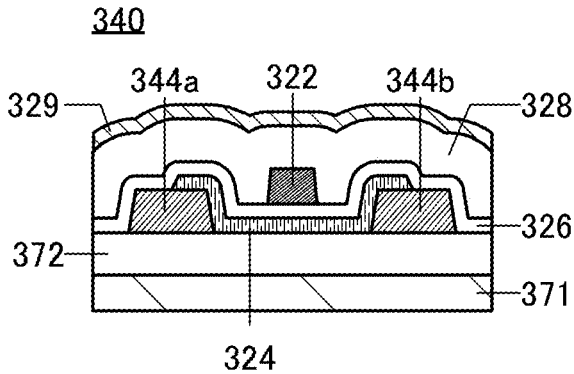
FIG. 12B1
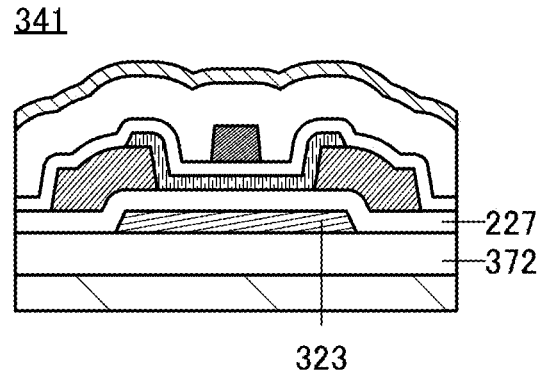
FIG. 12B2

FIG. 13A1
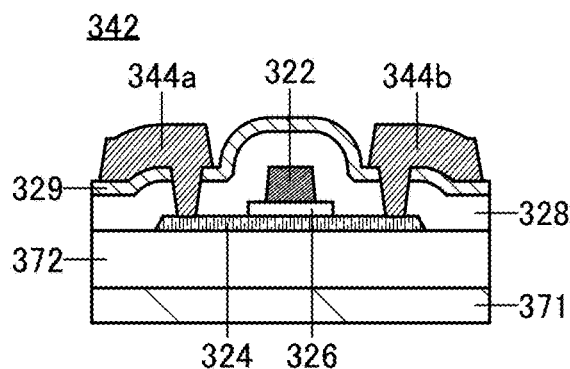
FIG. 13A2
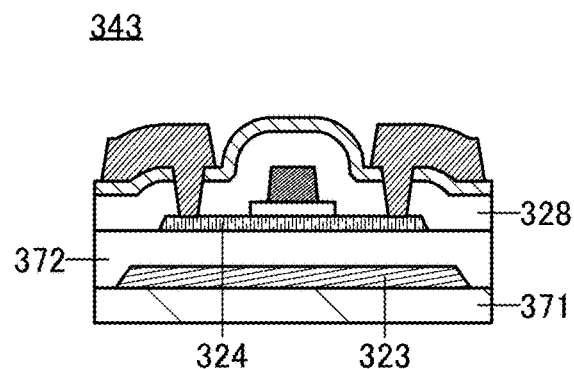
FIG. 13A3
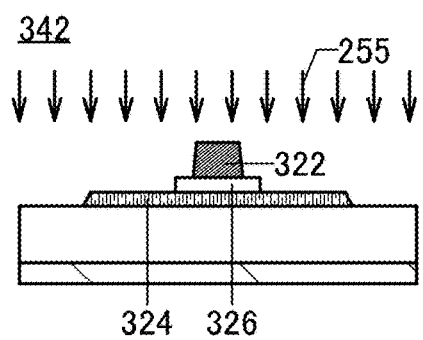
FIG. 13B1
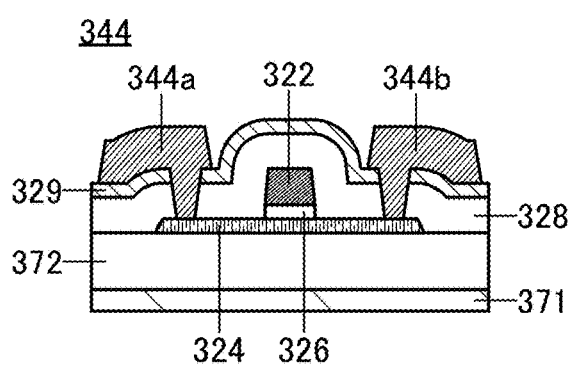
FIG. 13B2
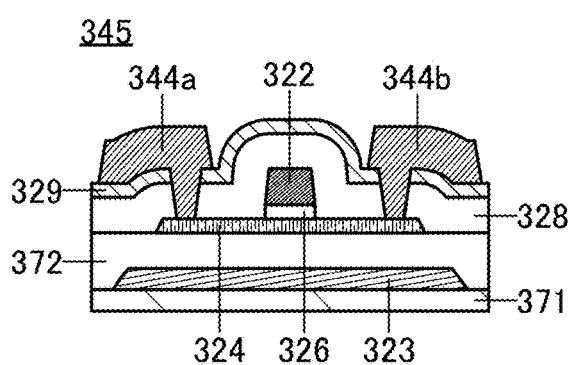
FIG. 13C1
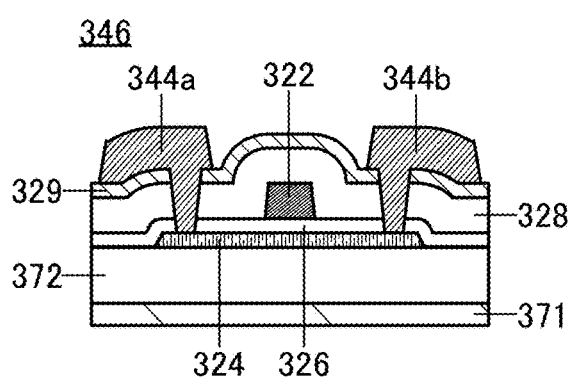
FIG. 13C2
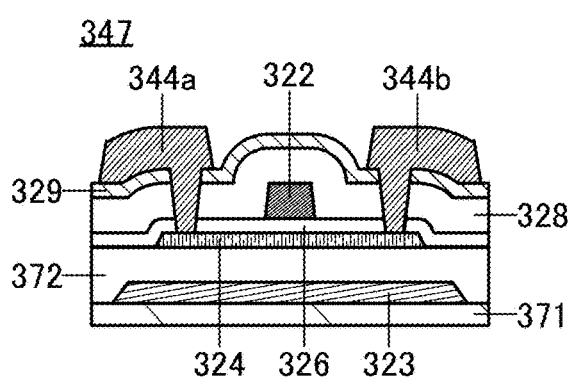

DISPLAY DEVICE COMPRISING AN IMAGE ANALYSIS UNIT, AND IMAGE CALCULATION PROCESSING UNIT

TECHNICAL FIELD

One embodiment of the present invention relates to a display device.

BACKGROUND ART

There is increasing demand for viewing high-resolution images. High-resolution images have a high amount of data. Meanwhile, increased speed of transferring information is required.

Patent Document 1 discloses a method for inhibiting the increase in speed of transferring information by preparing a plurality of images with different resolutions and displaying high-resolution images in the region which the user is viewing and low-resolution images in other regions (Patent Document 1).

REFERENCE

Patent Document

[Patent Document 1] Japanese Published Patent Application No. 2015-222470

SUMMARY OF THE INVENTION

Problems to be Solved by the Invention

In order to generate a high-resolution image source from a low-resolution image source (also referred to as upconversion), image data of the original low-resolution image source needs to be interpolated. Algorithms that interpolate image data through upconversion are required to be more advanced when an image is made to be more natural. In the case where upconversion is performed by applying an advanced algorithm to the whole low-resolution image source, the amount of calculation is increased in accordance with the increase in the number of pixels, which may possibly raise power consumption.

An object of one embodiment of the present invention is to provide a display device in which the power consumption is lowered by reducing the amount of calculation when applying an upconversion algorithm to the original image data. Another object of one embodiment of the present invention is to provide a display device in which the power consumption is lowered by applying an optimal upconversion algorithm to each specific data in image data or each region that has an object (also referred to as a target block). Another object is to provide a novel display device.

Note that the descriptions of these objects do not hinder the existence of other objects. One embodiment of the present invention does not need to achieve all the objects. Other objects will be apparent from and can be derived from the description of the specification, the drawings, the claims, and the like.

Means for Solving the Problems

One embodiment of the present invention is a display device which includes an image analysis unit to which first image data is input, an image dividing unit which divides the first image data into a plurality of image data, and an image calculation processing unit which includes a plurality of super-resolution processing circuits performing different super-resolution processing to which the first image data divided for each super-resolution processing circuit is input, and which generates a plurality of second image data. The image analysis unit has a function of obtaining information of a target block in an image displayed on the basis of the first image data, a function of controlling the division of the first image data by the image dividing unit for each target block, and a function of controlling the input of any one of the divided first image data into any one of the plurality of super-resolution processing circuits.

One embodiment of the present invention is a display device which includes an image analysis unit to which first image data is input, an image dividing unit which divides the first image data into a plurality of image data, and an image calculation processing unit which includes a plurality of super-resolution processing circuits performing different super-resolution processing to which the first image data divided for each super-resolution processing circuit is input, and which generates a plurality of second image data. The image analysis unit has a function of obtaining information of a target block in an image displayed on the basis of a movement vector of the first image data, a function of controlling the division of the first image data by the image dividing unit for each target block, and a function of controlling the input of any one of the divided first image data into any one of the plurality of super-resolution processing circuits.

In one embodiment of the present invention, it is preferable that in the display device, the image analysis unit includes a neural network circuit that stores a learned weight parameter and the neural network circuit has a function of outputting, as output data, a signal selecting the super-resolution processing circuit to which the divided first image data including the target block is input, with the information of the target block being input data.

In one embodiment of the present invention, it is preferable that in the display device, the super-resolution processing circuit has a function of generating the second image data using any one of a Nearest neighbor method, a Bilinear method, a Bicubic method, a Lanczos method, an RAISR method, an ANR method, an A+ method, and an SRCNN method.

In one embodiment of the present invention, it is preferable that the display device includes an image synthesis unit which generates third image data by synthesizing a plurality of the second image data and a display unit which displays an image on the basis of the third image data; the display unit includes a pixel having a display element and a transistor, with the display element being a liquid crystal element or a light-emitting element.

In one embodiment of the present invention, it is preferable that in the display device, the transistor is a bottom-gate transistor.

In one embodiment of the present invention, it is preferable that in the display device, a semiconductor layer of the transistor includes amorphous silicon.

In one embodiment of the present invention, it is preferable that in the display device, 7600 or more of the pixels are placed in a row direction in the display unit and 4300 or more of the pixels are placed in a column direction in the display unit.

In one embodiment of the present invention, it is preferable that in the display device, the display unit has a diagonal of 60 inches or more.

Note that other embodiments of the present invention will be shown in the following embodiments and the drawings.

Effect of the Invention

One embodiment of the present invention can provide a display device in which the power consumption is lowered by reducing the amount of calculation when applying an upconversion algorithm to the original image data. One embodiment of the present invention can provide a display device in which the power consumption is lowered by applying an optimal upconversion algorithm to each specific data in image data or each region that has an object (also referred to as a target block). Alternatively, a novel display device can be provided.

Note that the descriptions of these effects do not hinder the existence of other effects. One embodiment of the present invention does not necessarily have to achieve all the effects. Other effects will be apparent from and can be derived from the description of the specification, the drawings, the claims, and the like.

BRIEF DESCRIPTION OF THE DRAWINGS

FIG. 6 Schematic diagrams illustrating an operation example of a display device.

FIG. 7 A chart illustrating an example of an algorithm.

FIG. 11 Diagrams illustrating structural examples of transistors.

FIG. 12 Diagrams illustrating structural examples of transistors.

FIG. 13 Diagrams illustrating structural examples of transistors.

MODE FOR CARRYING OUT THE INVENTION

Figure 1A:
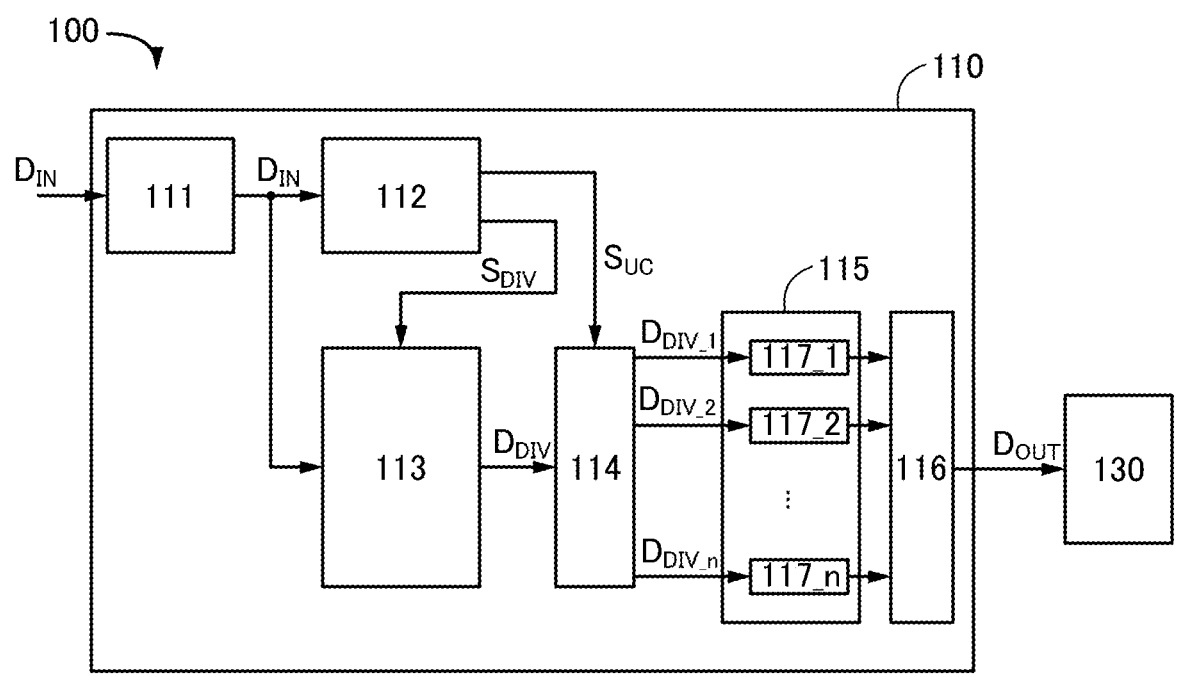
FIG. 1 A block diagram and a schematic diagram illustrating a display device.

Embodiments will be described in detail with reference to the drawings. Note that the present invention is not limited to the following descriptions, and it will be readily appreciated by those skilled in the art that the modes and details can be modified in various ways without departing from the spirit and the scope of the present invention. Thus, the present invention should not be construed as being limited to the descriptions in the following embodiments. Note that in the configurations of the invention described below, the same portions or portions having similar functions are denoted by the same reference numerals in different drawings, and description thereof may not be repeated.

Furthermore, the position, size, range, and the like of each component illustrated in the drawings and the like do not represent the actual position, size, range, and the like in some cases for easy understanding of the invention. Therefore, the disclosed invention is not necessarily limited to the position, size, range, and the like disclosed in the drawings and the like. For example, in the actual manufacturing process, a layer, a resist mask, or the like might be unintentionally reduced in size by treatment such as etching; the unintentional reduction is not clearly illustrated in some cases for easy understanding of the invention.

In particular, in a top view (also referred to as a "plan view"), a perspective view, or the like, illustration of some components may be omitted in some cases for easy understanding of the invention. Furthermore, some hidden lines and the like may not be shown.

Ordinal numbers such as "first" and "second" in this specification and the like are provided in order to avoid confusion among components and do not denote any priority or order such as the order of steps or the stacking order. Furthermore, a term that is not provided with an ordinal number in this specification and the like may be provided with an ordinal number in the scope of claims in order to avoid confusion among components. Furthermore, an ordinal number used in this specification and the like may be different from an ordinal number used in the scope of claims. Furthermore, a term provided with an ordinal number in this specification and the like may not be provided with an ordinal number in the scope of claims and the like.

In this specification and the like, the term such as "electrode" or "wiring" does not limit the components functionally. For example, an "electrode" is used as part of a "wiring" in some cases, and vice versa. Furthermore, the term "electrode" or "wiring" also includes the case where a plurality of "electrodes" or "wirings" are formed in an integrated manner.

Note that the terms "film" and "layer" can be interchanged with each other depending on the case or circumstances. For example, the term "conductive layer" can be changed into the term "conductive film" in some cases. For another example, the term "insulating film" can be changed into the term "insulating layer" in some cases.

Unless otherwise specified, in this specification and the like, a transistor is an element having at least three terminals including a gate (a gate terminal or a gate electrode), a source (a source terminal, a source region, or a source electrode), and a drain (a drain terminal, a drain region, or a drain electrode), or an element having at least four terminals including a back gate (a back gate terminal or a back gate electrode). The transistor includes a channel formation region between a source and a drain, and can allow current to flow between the source and the drain through the channel formation region. Note that in this specification and the like, the channel formation region refers to a region through which current mainly flows.

Unless otherwise specified, transistors described in this specification and the like are enhancement mode (normally-off mode) field-effect transistors. Furthermore, unless otherwise specified, transistors described in this specification and the like are n-channel transistors. Thus, unless otherwise specified, the threshold voltage (also referred to as "Vth") is higher than 0 V.

Note that unless otherwise specified, Vth of a transistor including a back gate in this specification and the like refers to Vth when the potential of the back gate is set equal to the potential of a source or a gate.

Unless otherwise specified, off-state current in this specification and the like refers to drain current (also referred to as "Id") of a transistor in an off state (also referred to as a non-conducting state or a cutoff state). Unless otherwise specified, the off state of an n-channel transistor means the state where the potential difference (also referred to as a "gate voltage" or "Vg") between its gate and source when the potential of its source is regarded as a reference potential is lower than the threshold voltage, and the off state of a p-channel transistor means the state where Vg is higher than the threshold voltage. For example, the off-state current of an n-channel transistor sometimes refers to drain current when Vg is lower than Vth.

In the above description of off-state current, a drain may be interchanged with a source. That is, the off-state current sometimes refers to current that flows through a source of a transistor in an off state.

Furthermore, in this specification and the like, leakage current is sometimes used to express the same meaning as off-state current. In addition, in this specification and the like, the off-state current sometimes refers to current that flows between a source and a drain of a transistor in the off state, for example.

In this specification and the like, a potential VDD refers to a power supply potential that is of a higher potential than a potential VSS. The potential VSS is a power supply potential that is of a lower potential than the potential VDD. In addition, a ground potential can also be used as VDD or VSS. For example, in the case where VDD is a ground potential, VSS is a potential lower than the ground potential, and in the case where VSS is a ground potential. VDD is a potential higher than the ground potential.

A "voltage" usually refers to a potential difference between a given potential and a reference potential (e.g., aground potential (GND) or a source potential). A "potential" is relative, and a potential supplied to a wiring or the like changes depending on the reference potential in some cases. Therefore, the terms "voltage" and "potential" can be replaced with each other in some cases. Note that in this specification and the like, VSS is the reference potential unless otherwise specified.

Note that the term "over" or "under" in this specification and the like does not necessarily mean directly over or directly under and directly in contact in a positional relationship between components. For example, the expression "an electrode B over an insulating layer A" does not necessarily mean that the electrode B is provided over and directly in contact with the insulating layer A and does not exclude the case where another component is included between the insulating layer A and the electrode B.

In this specification and the like, "parallel" indicates a state where two straight lines are placed at an angle of greater than or equal to −10° and less than or equal to 10°, unless otherwise specified. Accordingly, the case where the angle is greater than or equal to −5° and less than or equal to 5° is also included. Furthermore, "substantially parallel" indicates a state where two straight lines are placed at an angle of greater than or equal to −30° and less than or equal to 30° unless otherwise specified. Furthermore, "perpendicular" and "orthogonal" indicate a state where two straight lines are placed at an angle of greater than or equal to 80° and less than or equal to 100° unless otherwise specified. Accordingly, the case where the angle is greater than or equal to 85° and less than or equal to 95° is also included. In addition, "substantially perpendicular" indicates a state where two straight lines are placed at an angle of greater than or equal to 60° and less than or equal to 120° unless otherwise specified.

Note that in this specification and the like, "identical", "the same", "equal", "uniform", and the like (including synonyms thereof) used for describing calculation values and measurement values contain an error of ±20% unless otherwise specified.

In this specification and the like, an artificial neural network (ANN, hereinafter referred to as neural network) generally means a model that imitates a biological neural network. In general, a neural network has a structure in which units that imitate neurons are connected to each other through a unit that imitates a synapse.

The connection strength (also referred to as a weight coefficient) between synapses (connection between neurons) can be changed when the neural network is provided with existing information. The processing for determining a connection strength by providing a neural network with existing information in such a manner is called "learning" in some cases.

Furthermore, when a neural network in which "learning" has been performed (a connection strength has been determined) is provided with any type of information, new information can be output on the basis of the connection strength. The processing for output of new information on the basis of information provided and the connection strength in a neural network is called "inference" or "recognition" in some cases.

Examples of a neural network model include a Hopfield type, a hierarchical type, and the like. In particular, a neural network with a multilayer structure is called a "Deep Neural Network" (DNN), and machine learning using a deep neural network is called "deep learning". Note that in DNN, a Full Connected-Neural Network (FC-NN), a Convolutional Neural Network (CNN), a Recurrent Neural Network (RNN), and the like are included.

Furthermore, in this specification and the like, a transistor in which an oxide semiconductor, which is a type of metal oxide, is used for the semiconductor layer where the channel is formed is also referred to as an "OS transistor". Furthermore, a transistor in which silicon is used for the semiconductor layer where the channel is formed is also referred to as a "Si transistor".

Embodiment 1

In this embodiment, a configuration example of a display device 100 of one embodiment of the present invention will be described with reference to drawings.

<Configuration Example of Display Device>

Figure 1B:
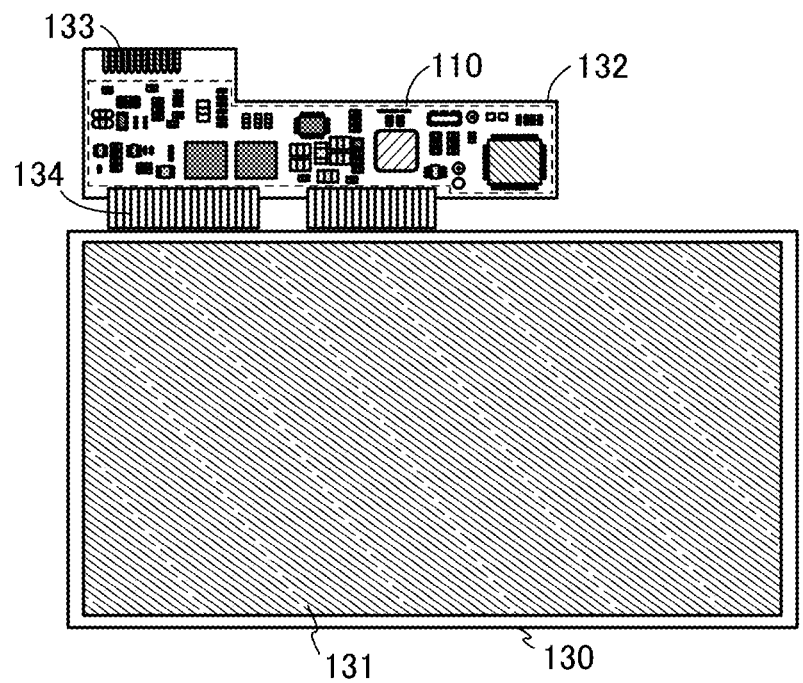

FIG. 1(A) illustrates a block diagram of the display device 100. FIG. 1(B) illustrates a schematic diagram of the display device 100.

Note that in FIG. 1(A), the block diagram in which components are classified according to their functions and shown as independent blocks is illustrated; however, it is difficult to separate actual components completely according to their functions, and it is possible for one component to relate to a plurality of functions or a function to relate to a plurality of components.

The display device 100 includes an image processing device 110 and a display unit 130.

The image processing device 110 includes an image data input unit 111, an image analysis unit 112, an image dividing unit 113, a switching circuit 114, an image calculation processing unit 115, and an image synthesis unit 116. The image calculation processing unit 115 includes a plurality of super-resolution processing circuits 117 (a super-resolution processing circuit 117_1 to a super-resolution processing circuit 117_n (n is a natural number greater than or equal to 2)).

Image data $D_{IN}$, which is a low-resolution image source, is input to the image processing device 110. The image processing device 110 has a function of converting the image data $D_{IN}$ into image data $D_{OUT}$ which is a high-resolution image source. In other words, the image processing device 110 is a device that outputs the image data $D_{OUT}$ obtained by upconversion of the image data $D_{IN}$.

As illustrated in FIG. 1(B), circuits included in the image processing device 110 (the image data input unit 111, the image analysis unit 112, the image dividing unit 113, the switching circuit 114, the image calculation processing unit 115, and the image synthesis unit 116) are integrated circuits provided over a printed wiring board 132.

The image data $D_{IN}$ is input from an input terminal 133, converted into the image data $D_{OUT}$ which is upconverted by the image processing device 110, and then is output to the display unit 130. The display unit 130 includes a pixel unit 131.

The pixel unit 131 includes a pixel that contains a display element and a transistor. The display element is preferably a liquid crystal element or a light-emitting element. The transistor is preferably a bottom-gate transistor. A semiconductor layer of the transistor preferably includes amorphous silicon.

When a bottom-gate transistor is used, the number of masks can be reduced. In addition, by using amorphous silicon as the semiconductor layer of the transistor, a manufacturing method for fabricating a transistor on a large substrate can be employed. Therefore, the display device can have high mass productivity and a display unit that can be increased in area.

The image data input to the display unit 130 is the image data Dour which is upconverted by the image processing device 110. Thus, the pixel unit 131 has a structure in which 7600 or more pixels are arranged in the row direction and 4300 or more pixels are arranged in the column direction; and with a diagonal of 60 inches or more, the display device can have excellent realistic sensation and high display quality.

Furthermore, when a liquid crystal element is employed as a display element, the thickness of the display device can be reduced, which is favorable. When a light-emitting element is employed as a display element, the contrast ratio can be increased, for example, and a marking device can have a favorable display quality.

Next, the configurations included in the image processing device 110 illustrated in FIG. 1(A) are described.

The image data input unit 111 has a function of storing the image data D input from the outside. For example, a volatile memory element such as a DRAM (Dynamic RAM) or an SRAM (Static RAM) can be used. Note that the image data input unit 111 may have a function of decoding, for example, in the case where the image data $D_{IN}$ is compressed data. Alternatively, the image data input unit 111 may have a function of converting the image data $D_{IN}$ into a specific format. The image data input unit 111 can also be omitted.

The image analysis unit 112 has a function of obtaining information of target blocks in an image displayed on the basis of the image data $D_{IN}$. In addition, the image analysis unit 112 has a function of outputting a control signal $S_{DIV}$ for controlling the division of image data $D_{IN}$ for each target block in the image dividing unit 113. Moreover, the image analysis unit 112 has a function of outputting a control signal $S_{UC}$ for controlling input of any one of divided image data (image data $D_{DIV}$, or image data $D_{DIV\_1}$ to image data $D_{DIV\_n}$ (N is a natural number greater than or equal to 2)) to any one of the plurality of the super-resolution processing circuit 117_1 to the super-resolution processing circuit 117_n where different super-resolution processing are performed.

Note that a target block refers to an object in an image displayed on the basis of the image data $D_{IN}$, or a specific area in the image, for example. Specifically, a target block represents a person, vehicle, scenery, or the like. Extraction of a target block can be performed by calculating the local feature amount on the basis of the movement vector which can be obtained by comparison of images between a plurality of frames and the data of each pixel in the image data. Alternatively, information of a target block may be obtained by inputting the image data $D_{IN}$ to a neural network circuit to perform image recognition.

The image analysis unit 112 generates the control signal $S_{DIV}$ for dividing the image data $D_{IN}$ on the basis of information of a target block (hereinafter, referred to as target block data $D_{TBIN}$). The control signal $S_{DIV}$ is output to the image dividing unit 113. The image data $D_{DIV}$ divided into a plurality of image data and generated by the image dividing unit 113 can be the image data DD which include different target blocks as a result of the controlling of the control signal $S_{DIV}$.

Moreover, the image analysis unit 112 generates the control signal $S_{UC}$ for selecting an upconversion algorithm applied to the image data $D_{DIV}$ containing an image of the target block, on the basis of the target block data $D_{TBIN}$. The control signal $S_{UC}$ controls input to any one of the plurality of the super-resolution processing circuit 117_1 to the super-resolution processing circuit 117_N in which different super-resolution processing are performed, so as to select what kind of upconversion algorithm will be applied to any one of the divided image data $D_{DIV\_1}$ to image data $D_{DIV\_n}$.

The selection of upconversion algorithm applied to the image data $D_{DIV}$ is performed on the basis of target block data $D_{TBOUT}$ which can be obtained on the basis of the target block data $D_{TBIN}$. The output of the target block data $D_{TBOUT}$ differs for each image of the target block which is an object or a specific area within an image. For example, an upconversion algorithm for making a low-quality image is applied to image data which includes a target block such as a vehicle moving at high speed. Conversely, an upconversion algorithm for making a high-quality image is applied to image data which includes a target block such as a person moving at low speed, so that the image data appears natural.

When the upconversion algorithm for making a low-quality image is applied to the image data which includes a target block moving at low speed, the display quality of the image data is perceived to have decreased significantly. On the other hand, when the upconversion algorithm for making a low-quality image is applied to the image data which includes a target block moving at high speed, the display quality does not decrease significantly compared to that when the upconversion algorithm for making a high-quality image is applied. That is, the display device of one embodiment of the present invention can have a configuration in which an upconversion algorithm for making a high-quality image is not applied evenly to the image data, and the algorithm used for upconversion varies according to each image data which includes a target block. Therefore, the display device of one embodiment of the present invention can improve display quality and shorten the processing time for upconverting the image data.

Specifically, a Nearest neighbor method, Bilinear method, a Bicubic method, a Lanczos method, an RAISR method, an ANR method, an A+ method, and an SRCNN method can be given as algorithms used for upconversion. Of these algorithms, the above-described algorithms which perform low-quality upconversion are a Nearest neighbor method, a Bilinear method, and a Bicubic method. The algorithms which perform intermediate-quality upconversion are an RAISR (Rapid and Accurate Image Super-Resolution) method, an ANR (Anchored Neighborhood Regression) method, and an A+ method. The algorithm which perform the above-described high-quality upconversion is an SRCNN (Super-Resolution Convolutional Neural Network) method.

Figure 2:
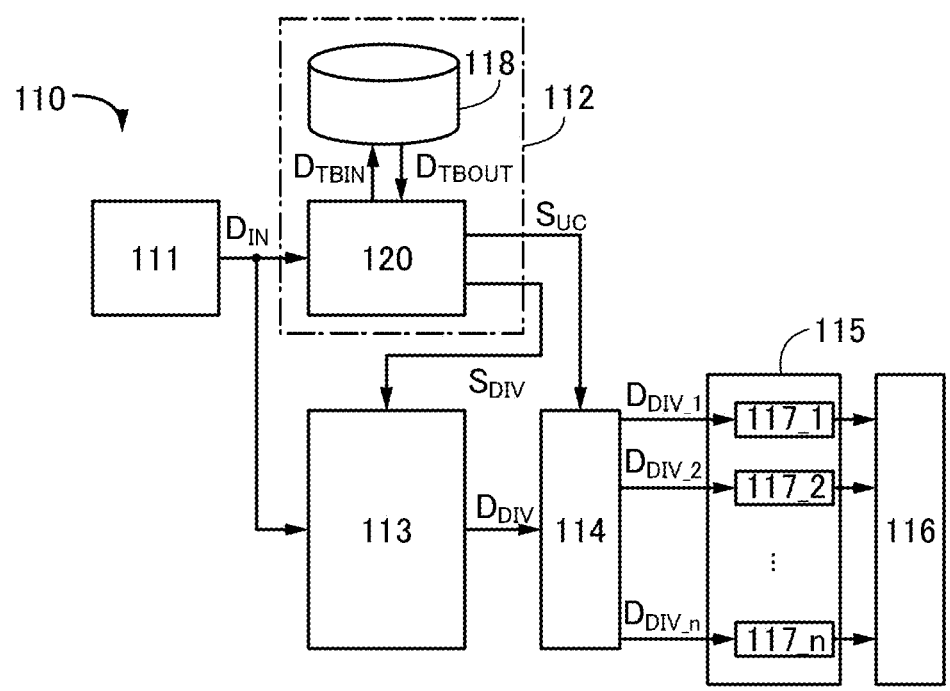
FIG. 2 A block diagram illustrating a display device.

Note that it is favorable to use a neural network circuit that stores a learned weight parameter for generating the target block data $D_{TBOUT}$ which is based on the target block data $D_{TBIN}$. A specific configuration example is illustrated in FIG. 2. In FIG. 2, the image analysis unit 112 includes a signal generation unit 120 and a neural network circuit 118.

The neural network circuit 118 is a circuit which obtains a target block data $D_{TBOUT}$ with the target block data $D_{TBIN}$ as input data. The neural network circuit 118 stores a learned weight coefficient so that the target block data $D_{TBOUT}$ can be output in response to the input of the target block data $D_{TBIN}$ to obtain the algorithm that performs upconversion corresponding to the target block.

In the signal generation unit 120, the extraction of a target block is performed by calculation of the feature amount on the basis of the movement vector obtained by comparison of images between a plurality of frames and the data of each pixel in the image data, generating the target block data $D_{TBIN}$. The target block data $D_{TBOUT}$ is then obtained from the neural network circuit 118 on the basis of the generated target block data $D_{TBIN}$, whereby the control signal $S_{UC}$ which selects the algorithm performing upconversion corresponding to the target block in the image data $D_{IN}$ can be output.

The image dividing unit 113 has a function of dividing the image data $D_{IN}$ into a plurality of image data in accordance to the control signal $S_{DIV}$. The image data $D_{DIV}$ which has been divided into a plurality of image data is output to the switching circuit 114.

The switching circuit 114 has a function of allotting the image data $D_{DIV}$ which is to be input to any one of the super-resolution processing circuit 117_1 to the super-resolution processing circuit 117_$n$ in accordance to the control signal $S_{UC}$ which selects the upconversion algorithm. Among the image data $D_{DIV}$, image data to be input to the super-resolution processing circuit 117_1 is illustrated as image data $D_{DIV\_1}$. Among the image data $D_{DIV}$, image data to be input to the super-resolution processing circuit 117_2 is illustrated as image data $D_{DIV\_2}$. Among the image data $D_{DIV}$, image data to be input to the super-resolution processing circuit 117_$n$ is illustrated as image data $D_{DIV\_n}$.

The image calculation processing unit 115 includes the plurality of super-resolution processing circuits 117_1 to 117_$n$. The super-resolution processing circuits 117_1 to 117_$n$ are capable of upconversion using different algorithms. For example, the super-resolution processing circuit 117_1 is a circuit that performs upconversion using an algorithm of any one of a Nearest neighbor method, a Bilinear method, a Bicubic method, a Lanczos method, an RAISR method, an ANR method, an A+ method and an SRCNN method, and the super-resolution processing circuit 117_2 is a circuit that performs upconversion using an algorithm of a method different from that of the super-resolution processing circuit 117_1. The super-resolution processing circuits 117_1 to 117_$n$ convert the image data $D_{DIV\_1}$ to the image data $D_{DIV\_n}$ to upconverted image data (illustrated as image data $D_{DIV\_1*UC\_1}$ to image data $D_{DIV\_n*UC\_n}$ in some cases) and output the upconverted image data to the image synthesis unit 116.

The image synthesis unit 116 synthesizes a plurality of image data which are upconverted using different algorithms, and outputs the image data $D_{OUT}$, which is the upconverted image data $D_{IN}$, to the display unit 130.

Although FIG. 1 and FIG. 2 illustrate configurations in which the image data allotted with the switching circuit 114 is used to input the split image data to the super-resolution processing circuit which performs upconversion with a suitable algorithm, other configurations may be employed.

Figure 3A:
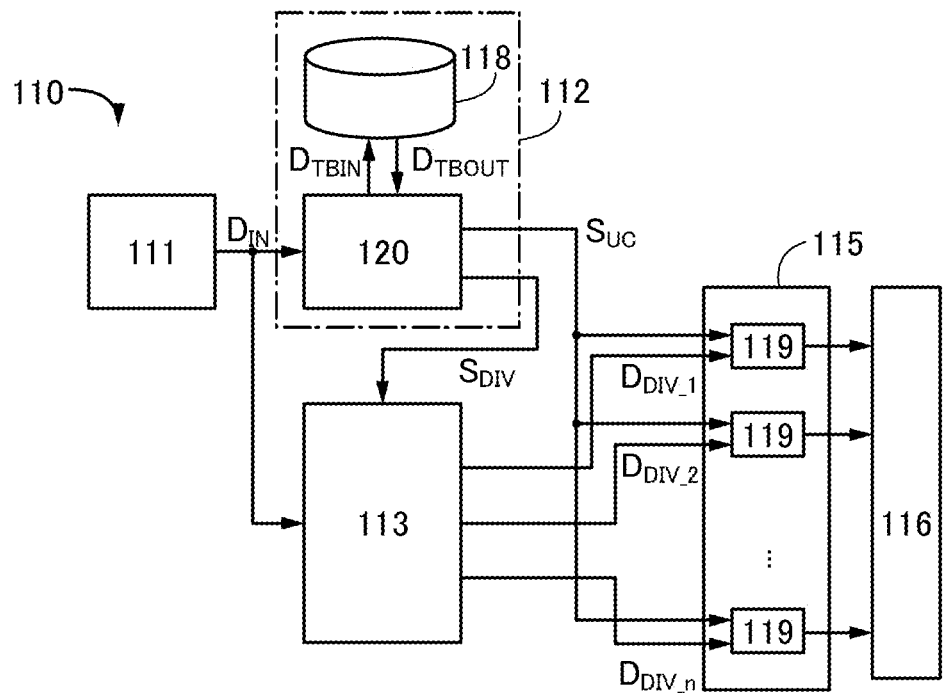
FIG. 3 Block diagrams illustrating a display device.

For example, FIG. 3(A) illustrates a configuration in which the image calculation processing unit 115 includes a plurality of super-resolution processing circuits 119. Any one of the image data $D_{DIV\_1}$ to $D_{DIV\_n}$ divided from the image dividing unit 113 and the control signal $S_{UC}$ are input to the super-resolution processing circuits 119. With the input of the control signal $S_{UC}$, the super-resolution processing circuits 119 are circuits that can switch to perform upconversion using the algorithm of any one of a Nearest neighbor method, a Bilinear method, a Bicubic method, a Lanczos method, an RAISR method, an ANR method, an A+ method, and an SRCNN method. Therefore, any one of the image data $D_{DIV\_1}$ to $D_{DIV\_n}$ can be upconverted using an algorithm corresponding to the target block.

Although the configurations in FIG. 1 and FIG. 2 are described as configurations that generate the target block data $D_{TBIN}$ using the image data $D_{IN}$ input to the image analysis unit 112, other configurations may be employed.

Figure 3B:
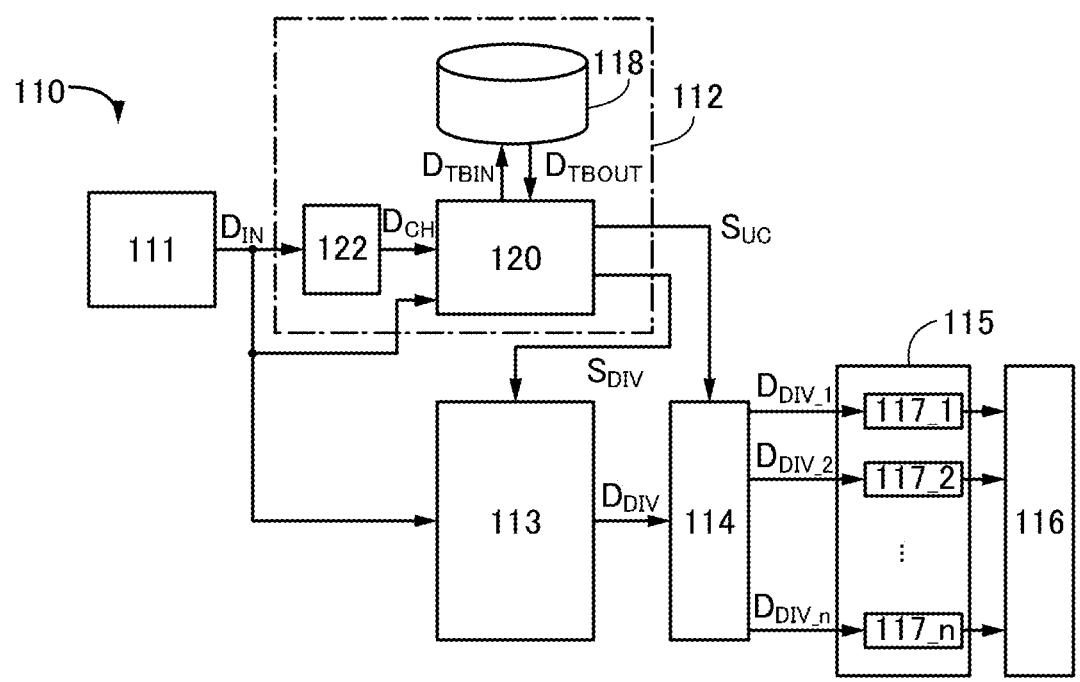

For example, as illustrated in FIG. 3(B), a configuration is such that a feature amount extraction circuit 122 is provided separate from the signal generation unit 120 and the neural network circuit 118. The feature amount extraction circuit 122 inputs to the signal generation unit 120 data $D_{CH}$, which includes a movement vector obtained by comparison of images between a plurality of frames on the basis of the image data $D_{IN}$, and a feature amount based on data of each pixel in the image data. The signal generation unit 120 can generate the target block data $D_{TBIN}$ on the basis of the image data $D_{IN}$ and the data $D_{CH}$.

<Operation Example of Display Device>

Next, an operation example of the image processing device 110 illustrated in FIG. 2 is described.

Figure 4:
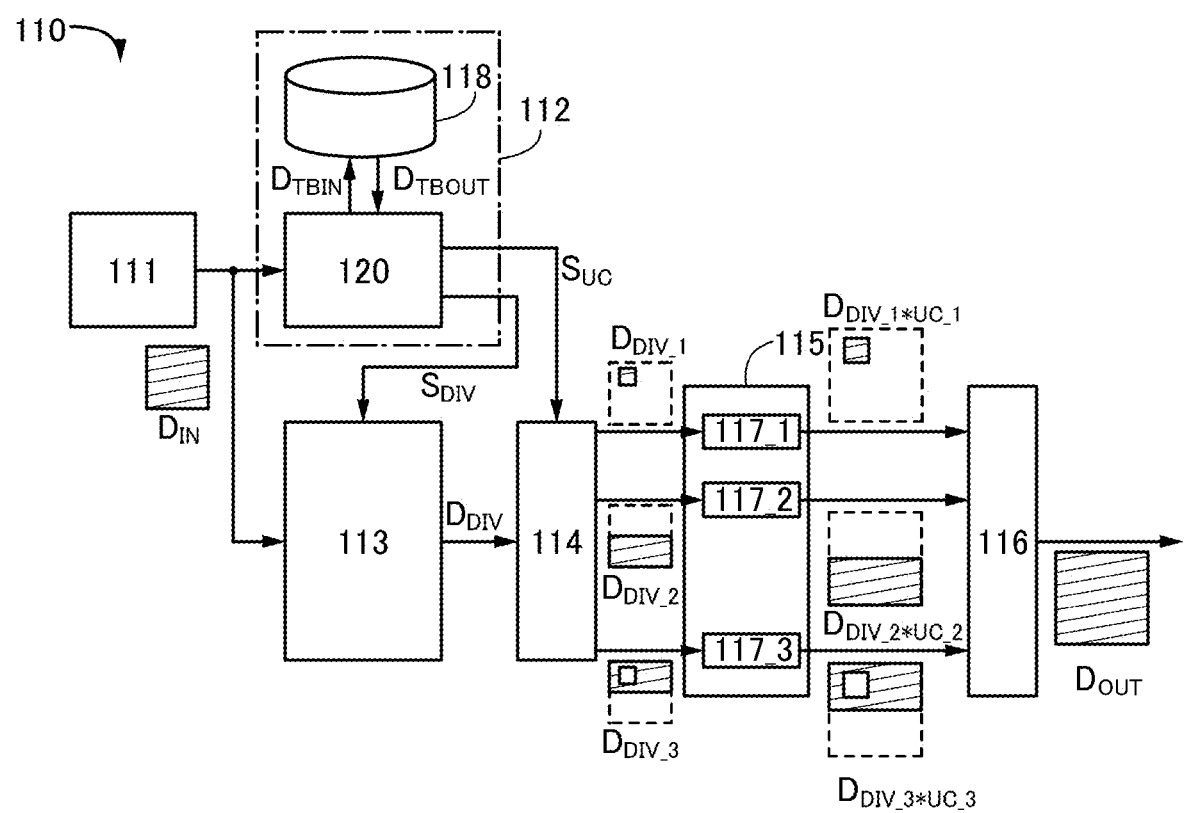
FIG. 4 A block diagram illustrating a display device.

FIG. 4 is a diagram which has a schematic diagram of an image corresponding to image data added to the block diagram of the image processing device 110 illustrated in FIG. 2.

For example, a square with hatchings labeled as the image data $D_{IN}$ represents an image based on the original image data. In addition, the rectangles with hatchings which are enclosed by squares with dashed lines, labeled as image data $D_{DIV\_1}$ to $D_{DIV\_3}$, represent the images based on image data divided into each target block. The rectangles with hatchings which are enclosed by squares with dashed lines, labeled as image data $D_{DIV\_1*UC\_1}$ to $D_{DIV\_3*UC\_3}$, represent the images based on image data that have been upconverted by different algorithms in the super-resolution processing circuits 117_1 to 117_3. The square with hatchings labeled as image data $D_{OUT}$ represents an image based on upconverted image data. Note that in FIG. 4, the image based on upconverted image data is illustrated to be larger than the image based on image data before upconversion.

As illustrated in FIG. 4, the display device of one embodiment of the present invention can have a configuration in which the upconversion algorithm is changed for every image data including target blocks instead of uniformly applying upconversion algorithm that turns the image data into a high-quality image. Therefore, in the display device of one embodiment of the present invention, the display quality can be improved, and in addition, the processing time of upconverting image data can be shortened.

Figure 5:
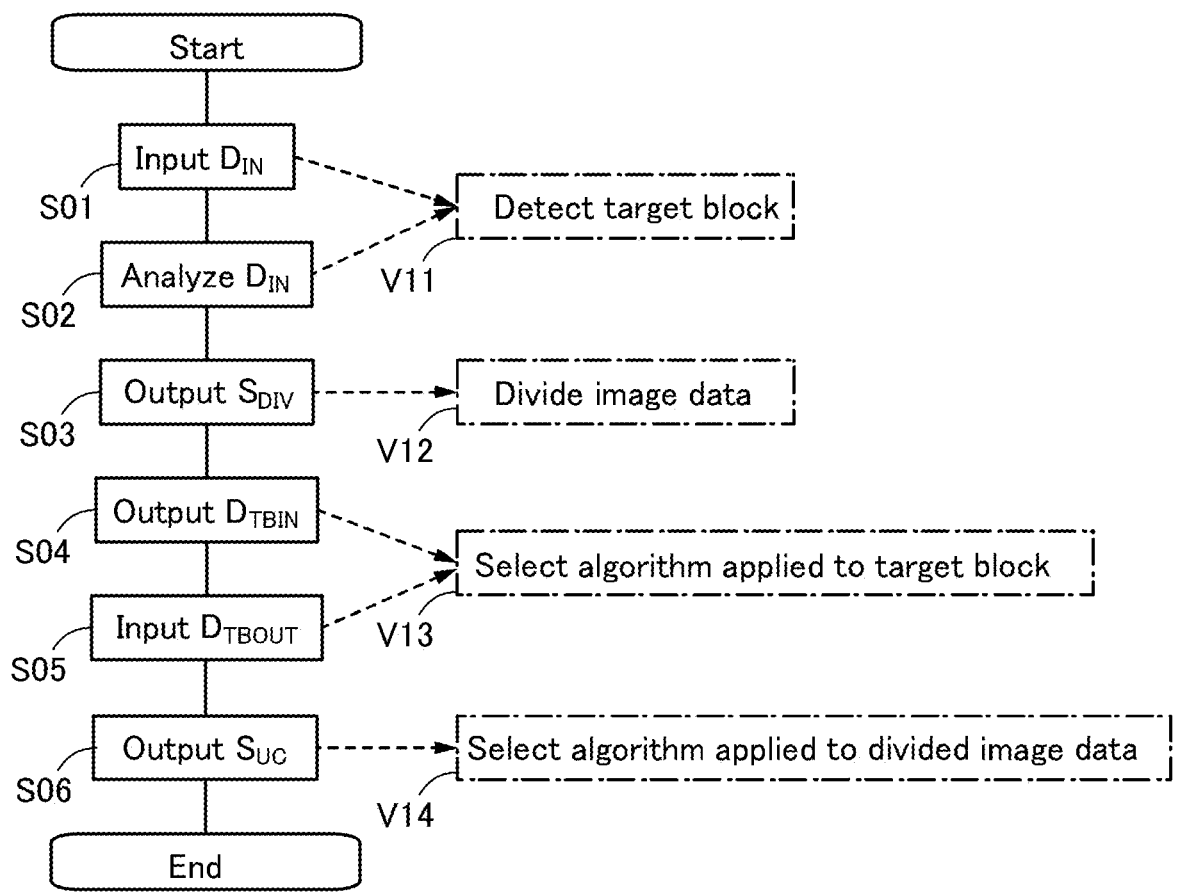
FIG. 5 A flow chart illustrating an operation example of a display device.

FIG. 5 is a flow chart describing an operation of the image processing device 110, with the focus on the image analysis unit 112.

First, the image data $D_{IN}$ is input (Step S01).

Next, the image data $D_{IN}$ is analyzed (Step S02). In Step S01 and Step S02 described above, identification of a target block, that is, the detection of a target block, V11, is performed.

Next, the control signal $S_{DIV}$ for dividing the image data into each target block is output to the image dividing unit 113 (Step S03). In Step S03, the division of image data, V12, is performed.

Next, the target block data $D_{TBIN}$ for selecting the upconversion algorithm applied to each target block is output to the neural network circuit 118 (Step S04). Then, the target block data $D_{TBOUT}$ related to the upconversion algorithm corresponding to the target blocks are input from the neural network circuit 118 (Step S05). In Step S04 and Step S05 described above, the selection of upconversion algorithm applied to a target block, V13, is performed.

Next, the control signal $S_{UC}$ for selecting the upconversion algorithm applied to divided image data is output to the switching circuit 114 (Step S06). In Step S06, the selection of algorithm applied to divided image data, V14, is performed.

FIG. 6 illustrates images displayed on the basis of the image data $D_{IN}$ to describe specific operation examples. In FIG. 6(A), as an image displayed on the basis of the image data, a situation in which pedestrians walking near a standing tree at a roadside with plantations and a car running is illustrated. Note that in FIG. 6(A), to show that the image is a low-resolution image before upconversion, the image is drawn with thin lines.

In FIG. 6(A), a standing tree, pedestrians, a car, plantations, and the like are illustrated, and in this case the standing tree, the pedestrians, the car, and the plantations in the regions enclosed by dashed-dotted line in FIG. 6(B) are extracted as target blocks, and the image can be divided into five including other components such as a road and a sidewalk. In other words, the image data $D_{IN}$ can be divided into five image data $D_{DIV\_1}$ to $D_{DIV\_5}$ illustrated in FIGS. 6(C-1) to 6(C-5). That is, the image analysis unit 112 in FIG. 1 outputs the control signal $D_{DIV}$ so as to divide into the five image data in FIGS. 6(C-1) to 6(C-5).

In FIGS. 6(C-1) to 6(C-5). FIG. 6(C-2) is the car and is a target block that moves at high speed. Therefore, upconversion algorithm which turns the image data into a low-quality image is applied as described above. In FIGS. 6(C-1) to 6(C-5), FIG. 6(C-4) is the pedestrians and is a target block that moves at low speed. Therefore, upconversion algorithm which turns the image data into a high-quality image is applied as described above. In FIGS. 6(C-1) to 6(C-5), FIGS. 6(C-1), 6(C-3) and 6(C-5) are stationary target blocks. In this case, upconversion algorithm which turns the image data into a high-quality or low-quality image may be applied. For example, upconversion algorithm which turns the image data into a high-quality image is applied to FIG. 6(C-3), and upconversion algorithm which turns the target into a low-quality image is applied to FIGS. 6(C-1) and 6(C-5). That is, the image analysis unit 112 illustrated in FIG. 1 outputs the control signal $S_{UC}$ so that the above-described upconversion algorithms are applied to the five image data in FIGS. 6(C-1) to 6(C-5).

To apply the selected upconversion algorithms to the above-described image data $D_{DIV\_1}$ to $D_{DIV\_5}$ in FIGS. 6(C-1) to 6(C-5), the image data $D_{DIV\_1}$ to $D_{DIV\_5}$ are input to any one of the super-resolution processing circuits 117_1 to 117_5 to perform upconversion using the algorithms (see FIG. 6(D)). Note that in FIG. 6(D), images that have been upconverted to high-quality images are drawn with bold lines, and images that have been upconverted to low-quality images are drawn with thin lines.

The upconverted image data $D_{DIV\_1*UC\_1}$ to $D_{DIV\_5*UC\_5}$ output from the super-resolution processing circuits 117_1 to 117_5 are synthesized to obtain the upconverted image data $D_{OUT}$ (see FIG. 6(D)).

<Various Algorithms for Performing Upconversion>

FIG. 7 illustrates an example of algorithms for performing upconversion. In FIG. 7, the algorithms are classified into Groups A, B, or C. The algorithms in Group A perform upconversion with simple calculation, the algorithms in Group B perform upconversion with machine learning, and the algorithm in Group C performs upconversion with deep learning using neural networks.

In FIG. 7, as Group A, a Nearest neighbor method, a Bilinear method and a Bicubic method are shown. As Group B, an RAISR (Rapid and Accurate Image Super-Resolution) method, an ANR (Anchored Neighborhood Regression) method, and an A+ method are shown. As Group C, an SRCNN (Super-Resolution Convolutional Neural Network) method is shown.

Of these algorithms, in terms of image quality after upconversion, the Nearest neighbor method is the worst and the SRCNN method is the best. In FIG. 7, the order of the image qualities and the processing speeds obtained in the algorithms are shown in the case when the image quality obtained in the Nearest neighbor method is set as the "worst" and the image quality obtained in the SCRNN method is set as the "best". In general, the algorithm with better image quality after upconversion has a slower processing speed. In particular, high-quality images can be obtained in upconversion methods such as the SRCNN method which uses a multilayer neural network, but the processing time becomes longer.

By changing the algorithm used for upconversion in accordance with the target block of image data $D_{IN}$, the processing time of upconversion can be shortened. In addition, a user can see a high-quality image with increased resolution.

<Neural Network Circuit 118>

Configuration examples of the neural network circuit 118 are described. In the neural network circuit 118, a weight coefficient (weight data) is preferably updated in advance by learning so that the target block data $D_{TBOUT}$ corresponding to the input target block data $D_{TBIN}$ can be output.

Figure 8C:
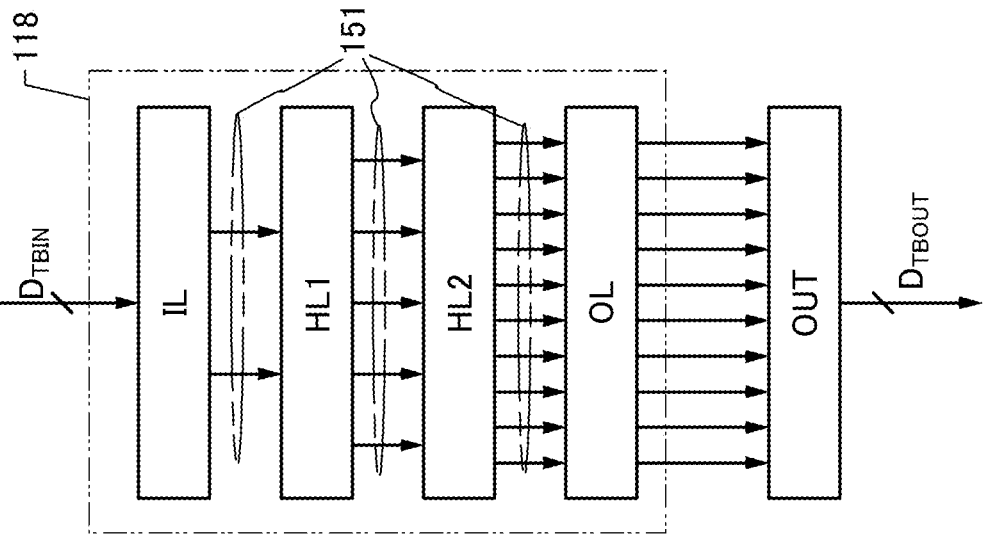
FIG. 8 Diagrams illustrating a configuration example of a neural network.
Figure 8A:
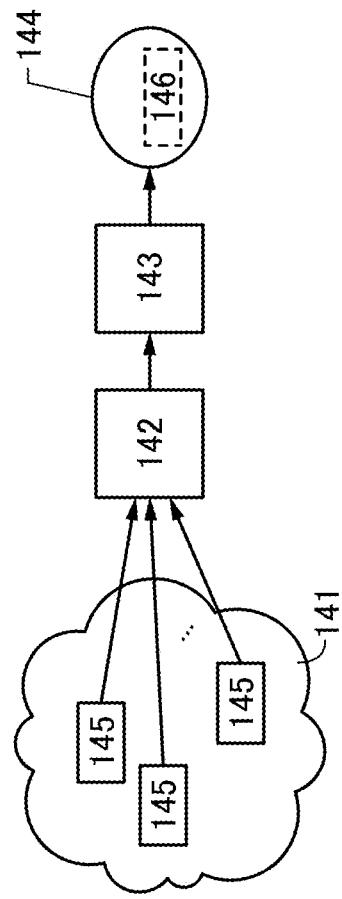

Specifically, as illustrated in FIG. 8(A), a learning neural network device 140 is prepared separately from the neural network circuit 118. Then, a large amount of image data 145 is prepared in a database 141, and the target block data $D_{TBIN}$ is extracted from the image data 145 to prepare a data set 142 labeled with the target block data $D_{TBOUT}$. The data set 142 is input to a learning neural network circuit 144 as teacher data 143, so that weight data 146 in the learning neural network circuit 144 is updated.

Figure 8B:
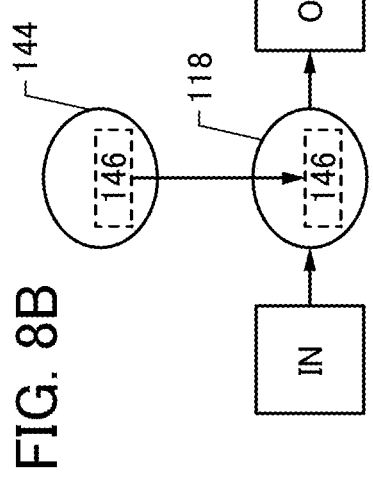

The weight data 146 which can be obtained in the learning neural network 144 illustrated in FIG. 8(A) is, as illustrated in FIG. 8(B), the weight data 146 in the neural network 118 illustrated in FIG. 2 and the like. By supplying the target block data $D_{TBIN}$ as input data IN to the neural network circuit 118 which has been supplied with the learned weight data 146, the set target block data $D_{TBOUT}$ can be obtained as output data OUT.

Here, a configuration example of the neural network circuit 118 is described (see FIG. 8(C)). The neural network circuit 118 includes an input layer IL, an intermediate layer HL1 (hidden layer), an intermediate layer HL2 (hidden layer), and an output layer OL. The neural network circuit 118 is a hierarchical neural network circuit 118 including the input layer IL, the intermediate layer HL1, the intermediate layer HL2, and the output layer OL. The intermediate layer HL1 and the intermediate layer HL2 have an arbitrary number of nodes. Note that the intermediate layers are not limited to two layers. The intermediate layers may be one layer, or three or more layers.

The target block data $D_{TBIN}$ is input to the input layer IL, and the weighted information is input to the intermediate layer HL1. The information input to the intermediate layer HL1 is weighted in a synapse layer 151 and input to the intermediate layer HL2. Information input to the intermediate layer HL2 is weighted in the synapse layer 151 and input to the output layer OL. The target block data $D_{TBOUT}$ is output from the output layer OL.

The neural network circuit 118 has a configuration in which the number of neurons increases as the depth of the hierarchy becomes deeper. That is, the number of neurons included in the intermediate layer HL1 is larger than the number of neurons included in the input layer IL, and the number of neurons included in the intermediate layer HL2 is larger than the number of neurons included in the intermediate layer HL. The number of neurons included in the output layer OL is larger than the number of neurons included in the intermediate layer HL2. Note that in FIG. 8(C), the above-described number of neurons is denoted by the number of arrows connecting the layers. When the neural network circuit 118 has a configuration in which the number of neurons increases as the depth of the hierarchy becomes deeper, the target block data $D_{TBOUT}$ can be generated on the basis of the target block data $D_{TBIN}$.

In the hierarchical neural network, the layers can be fully connected or the layers can be partially connected. In addition, the hierarchical neural network can have a configuration that use a convolution layer and a pooling layer between the layers.

<Summary>

According to one embodiment of the present invention described above, an upconversion algorithm for making a high-quality image is not applied evenly to the image data, and the upconversion algorithm can be changed for every image data including a target block. Therefore, in the display device of one embodiment of the present invention, the display quality can be improved and the processing time of upconverting the image data can be shortened. According to one embodiment of the present invention, the amount of calculations when applying the upconversion algorithm can be reduced, leading to low power consumption.

This embodiment can be implemented in an appropriate combination with the configurations described in the other embodiments and the like.

Embodiment 2

Figure 9A:
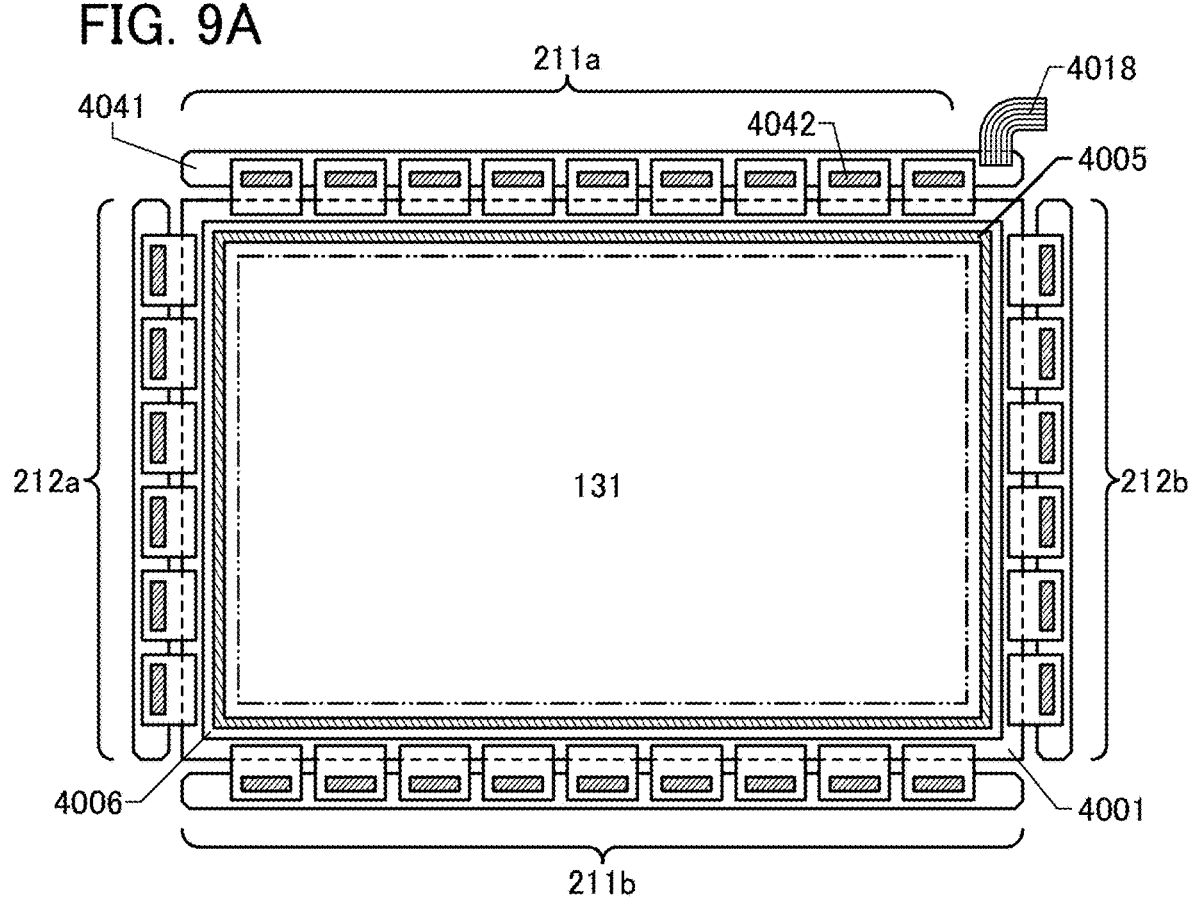
FIG. 9 Diagrams illustrating a display device.

In this embodiment, a configuration example of a display unit 130 using a liquid crystal element as a display element and a configuration example of the display unit 130 using an EL element as a display element are described. In FIG. 9(A), a sealant 4005 is provided so as to surround the pixel unit 131 provided over a first substrate 4001, and the pixel unit 131 is sealed by the sealant 4005 and a second substrate 4006.

In FIG. 9(A), a data driver 211a, a data driver 211b, a gate driver 212a, and a gate driver 212b each include a plurality of integrated circuit 4042 provided over a printed circuit board 4041. The integrated circuit 4042 is formed using a single crystal semiconductor or a polycrystalline semiconductor.

Various signals and potentials are supplied to the gate driver 212a, the gate driver 212b, the data driver 211a, and the data driver 211b through an FPC 4018.

The integrated circuits 4042 included in the gate driver 212a and the gate driver 212b have a function of supplying a selection signal to the pixel unit 131. The integrated circuits 4042 included in the data driver 211a and the data driver 211b have a function of supplying a video signal to the pixel unit 131. The integrated circuits 4042 are mounted by TAB (Tape Automated Bonding) method in a region different from the region surrounded by the sealant 4005 provided over the first substrate 4001.

Note that a connection method of the integrated circuit 4042 is not particularly limited, and a wire bonding method, a COG (Chip On Glass) method, a TCP (Tape Carrier Package) method, a COF (Chip On Film) method, or the like can be used.

Figure 9B:
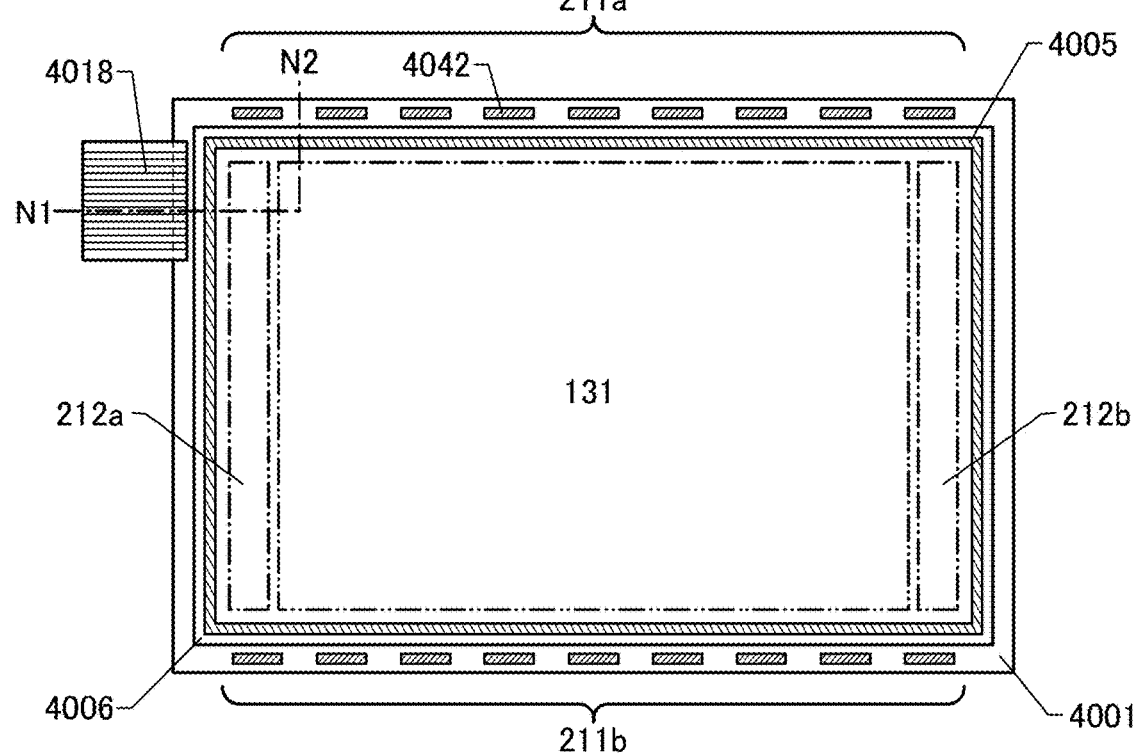

FIG. 9(B) illustrates an example in which the integrated circuits 4042 included in the data driver 211a and the data driver 211b are mounted by a COG method.

In FIG. 9(B), an example in which the gate driver 212a and the gate driver 212b are formed over the same substrate as the pixel unit 131 is illustrated. When the driver circuit is formed concurrently with the transistors included in the pixels in the pixel unit 131, the number of components can be reduced. Thus, the productivity can be increased.

In FIG. 9(B), the sealant 4005 is provided so as to surround the pixel unit 131, the gate driver 212a, and the gate driver 212b provided over the first substrate 4001. The second substrate 4006 is provided over the pixel unit 131, the gate driver 212a, and the gate driver 212b. Hence, the pixel unit 131, the gate driver 212a, and the gate driver 212b are sealed together with a display element by the first substrate 4001, the sealant 4005, and the second substrate 4006.

In FIG. 9(B), an example in which the data driver 211a and the data driver 211b are separately formed and mounted on the first substrate 4001 is illustrated; however, the configuration is not limited thereto. The gate driver may be formed separately and then mounted, or part of the data driver or part of the gate driver may be formed separately and then mounted.

In some cases, the pixel unit 131 includes a panel in which a display element is sealed and a module in which an IC such as a controller is included in the panel.

The display unit and the gate driver provided over the first substrate include a plurality of transistors.

The transistors included in the peripheral driver circuits and the transistors included in the pixels of the pixel unit 131 may have the same or different structures. The transistors included in the peripheral driver circuits may all have the same structure or a combination of two or more kinds of structures. Similarly, the transistors included in the pixels may all have the same structure or a combination of two or more kinds of structures.

When the pixels of the pixel unit 131 are arranged in a matrix of 1920×1080, the pixel unit 131 that can display with a resolution of a so-called full high definition (also referred to as "2K resolution". "2K1K", "2K", and the like) can be achieved. Also, for example, when the pixels are arranged in a matrix of 3840×2160, the pixel unit 131 that can display with a resolution of a so-called ultra high definition (also referred to as "4K resolution". "4K2K", "4K", and the like) can be achieved. In addition, for example, when the pixels are arranged in a matrix of 7680×4320, the pixel unit 131 that can display with a resolution of a so-called super high definition (also referred to as "8K resolution", "8K4K", "8K", and the like) can be achieved. By increasing the number of pixels, the pixel unit 131 that can display with a resolution of 16K and 32K can be achieved.

The pixels are arranged in a matrix in the pixel unit 131. For example, for 8K resolution, 7600 or more pixels are provided in the row direction, and 4300 or more pixels are provided in the column direction. Specifically, 7680 pixels are provided in the row direction and 4320 pixels are provided in the column direction. With this configuration, a high-definition image can be displayed.

Figure 10A:
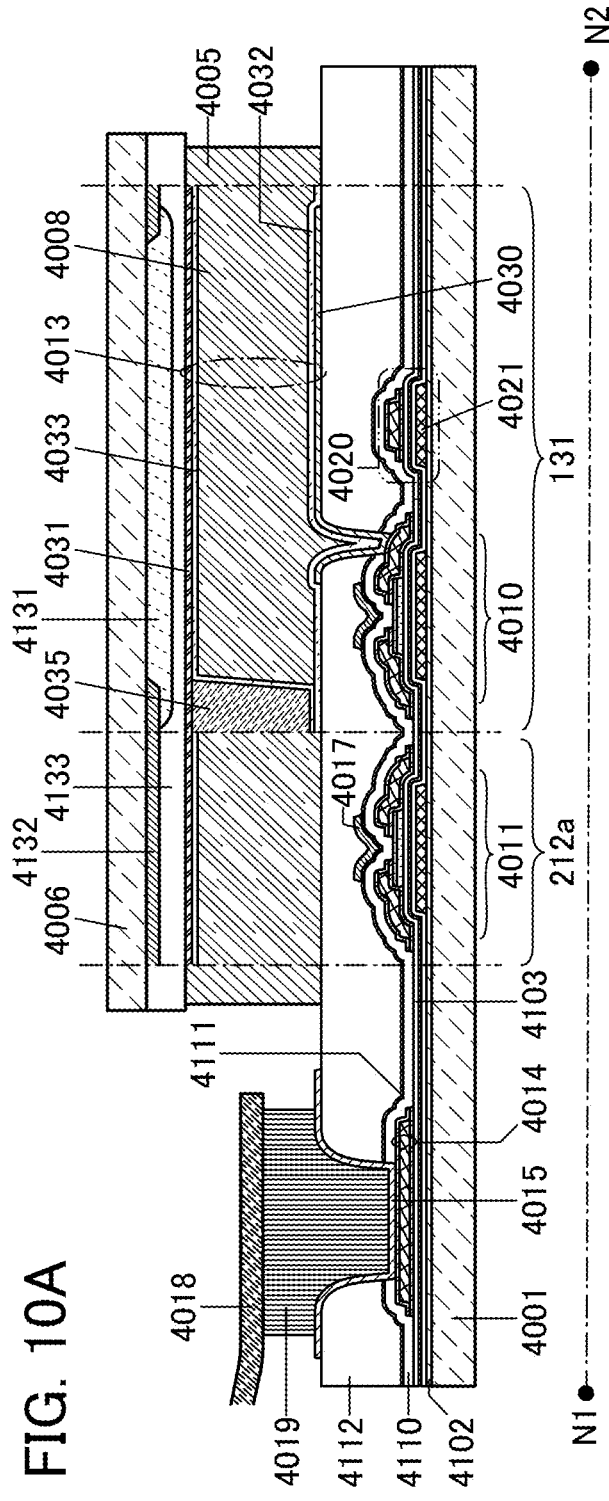
FIG. 10 Diagrams illustrating a display device.
Figure 10B:
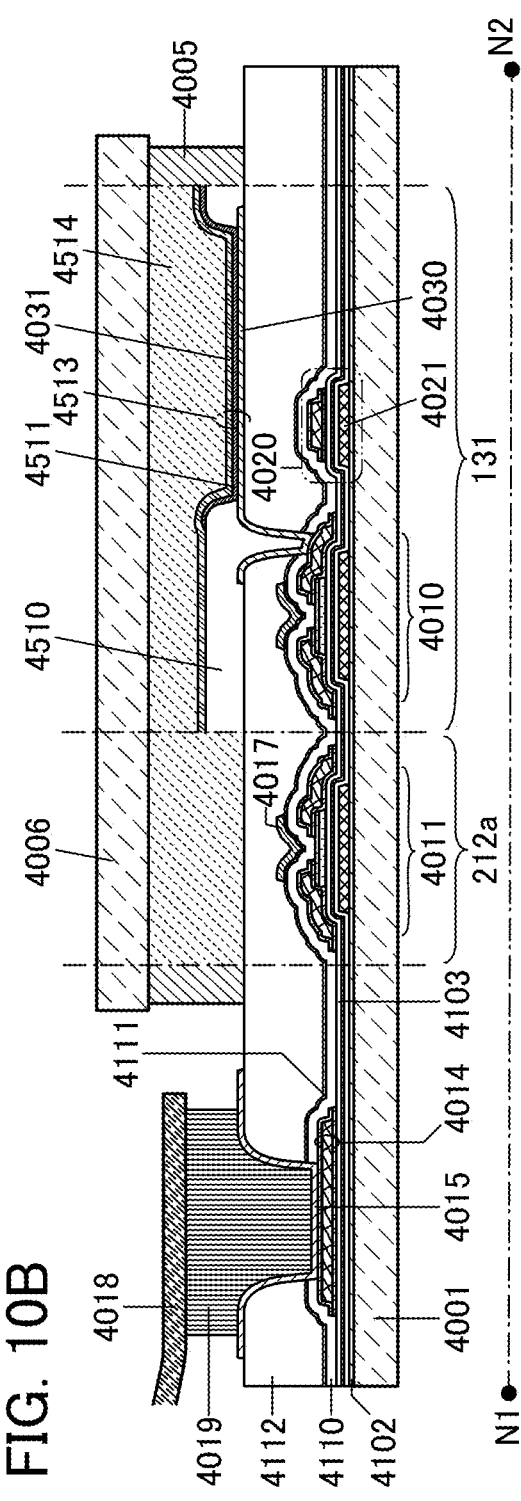

FIG. 10(A) and FIG. 10(B) are cross-sectional views of the portion illustrated by the dashed line N1-N2 in FIG. 9(B). The pixel unit 131 illustrated in FIG. 10(A) and FIG. 10(B) includes an electrode 4015, and the electrode 4015 is electrically connected to a terminal included in the FPC 4018 through an anisotropic conductive layer 4019. In FIG. 10(A) and FIG. 10(B), the electrode 4015 is electrically connected to a wiring 4014 in an opening formed in an insulating layer 4112, an insulating layer 4111, and an insulating layer 4110.

The electrode 4015 is formed using the same conductive layer as a first electrode layer 4030, and the wiring 4014 is formed using the same conductive layer as source electrodes and drain electrodes of a transistor 4010 and a transistor 4011.

The pixel unit 131 and the gate driver 212*a* which are provided over the first substrate 4001 include a plurality of transistors; and in FIG. 10(A) and FIG. 10(B), the transistor 4010 included in the pixel unit 131, and the transistor 4011 included in the gate driver 212*a* are illustrated. Note that in FIG. 10(A) and FIG. 10(B), the transistor 4010 and the transistor 4011 are illustrated as examples of bottom-gate transistors.

In FIG. 10(A) and FIG. 10(B), the insulating layer 4112 is provided over the transistor 4010 and the transistor 4011. In FIG. 10(B), a partition wall 4510 is formed over the insulating layer 4112.

The transistor 4010 and the transistor 4011 are provided over an insulating layer 4102. The transistor 4010 and the transistor 4011 include an electrode 4017 formed over the insulating layer 4111. The electrode 4017 can serve as a back gate electrode.

The pixel unit 131 illustrated in FIG. 10(A) and FIG. 10(B) includes a capacitor 4020. The capacitor 4020 includes an electrode 4021 formed in the same step as a gate electrode of the transistor 4010, and an electrode formed in the same step as a source electrode and a drain electrode of the transistor 4010. The electrodes overlap with each other with the insulating layer 4103 positioned therebetween.

Usually, the capacitance of a capacitor provided in the pixel unit 131 is set in consideration of the leakage current or the like of the transistor so that charge can be held for a predetermined period. The capacitance of the capacitor may be set in consideration of the off-state current of the transistor, for example.

The transistor 4010 provided in the pixel unit 131 is electrically connected to a display element. FIG. 10(A) illustrates an example of the pixel unit 131 that uses a liquid crystal element as the display element. In FIG. 10(A), the liquid crystal element 4013 which is the display element includes the first electrode layer 4030, a second electrode layer 4031, and a liquid crystal layer 4008. An insulating layer 4032 and an insulating layer 4033 having a function of alignment films are provided with the liquid crystal layer 4008 positioned therebetween. The second electrode layer 4031 is provided on the second substrate 4006 side, and the first electrode layer 4030 and the second electrode layer 4031 overlap with each other with the liquid crystal layer 4008 positioned therebetween.

A spacer 4035 is a columnar spacer obtained by selective etching of an insulating layer and is provided to adjust a distance (a cell gap) between the first electrode layer 4030 and the second electrode layer 4031. Note that a spherical spacer can also be used.

Moreover, a black matrix (a light-blocking layer), a coloring layer (a color filter), an optical member (an optical substrate) such as a polarizing member, a retardation member, or an anti-reflection member, and the like may be provided as appropriate. For example, circular polarization may be employed by using a polarizing substrate and a retardation substrate. In addition, a backlight, a side light, or the like may be used as a light source.

In the display device illustrated in FIG. 10(A), a light-blocking layer 4132, a coloring layer 4131, and an insulating layer 4133 are provided between the substrate 4006 and the second electrode layer 4031.

Examples of a material that can be used for the light-blocking layer include carbon black, titanium black, a metal, a metal oxide, and a composite oxide containing a solid solution of a plurality of metal oxides. The light-blocking layer may be a film containing a resin material or a thin film of an inorganic material such as a metal. A stacked-layer film containing the material of the coloring layer can also be used for the light-blocking layer. For example, a stacked-layer structure of a film containing a material of a coloring layer which transmits light of a certain color and a film containing a material of a coloring layer which transmits light of another color can be employed. The use of the same material for the coloring layer and the light-blocking layer is preferable, in which case the same apparatus can be used and the process can be simplified.

A metal material, a resin material, and a resin material containing a pigment or dye can be given as examples of a material that can be used for a coloring layer. The light-blocking layer and the coloring layer may be formed with a method similar to the above-described formation method of each layer. For example, an ink-jet method may be used.

The pixel unit 131 illustrated in FIG. 10(A) and FIG. 10(B) includes the insulating layer 4111 and the insulating layer 4103. As the insulating layer 4111 and the insulating layer 4103, an insulating layer that does not easily allow an impurity element to pass through is used. By interposing the semiconductor layer of the transistor between the insulating layer 4111 and the insulating layer 4103, the entry of impurities from the outside can be prevented.

A light-emitting element utilizing electroluminescence (also referred to as an "EL element") can be used as the display element included in the pixel unit 131. An EL element includes a layer containing a light-emitting compound between a pair of electrodes (also referred to as an "EL layer"). When a potential difference larger than the threshold voltage of the EL element is generated between a pair of electrodes, holes are injected to the EL layer from the anode side and electrons are injected to the EL layer from the cathode side. The injected electrons and holes are recombined in the EL layer and a light-emitting substance contained in the EL layer emits light.

EL elements are classified according to whether a light-emitting material is an organic compound or an inorganic compound; in general, the former is referred to as an organic EL element, and the latter is referred to as an inorganic EL element.

In an organic EL element, by voltage application, electrons and holes are injected from one electrode and the other electrode respectively to an EL layer. The carriers (electrons and holes) are recombined, a light-emitting organic compound forms an excited state, and light is emitted when the excited state returns to a ground state. Owing to such a mechanism, this light-emitting element is referred to as a current-excitation light-emitting element.

Besides the light-emitting compound, the EL layer may also include a substance with a high hole-injection property, a substance with a high hole-transport property, a hole-blocking material, a substance with a high electron-transport property, a substance with a high electron-injection property, a substance with a bipolar property (a substance with a high electron-transport property and a high hole-transport property), and the like.

The EL layer can be formed by a method such as an evaporation method (including a vacuum evaporation method), a transfer method, a printing method, an inkjet method, or a coating method.

The inorganic EL elements are classified according to their element structures into a dispersion-type inorganic EL element and a thin-film inorganic EL element. A dispersion-type inorganic EL element has a light-emitting layer where particles of a light-emitting material are dispersed in a binder, and its light emission mechanism is donor-acceptor recombination type light emission that utilizes a donor level and an acceptor level. A thin-film inorganic EL element has a structure in which a light-emitting layer is interposed between dielectric layers, which are further interposed between electrodes, and its light emission mechanism is localized type light emission that utilizes inner-shell electron transition of metal ions. Note that a description is given here using an organic EL element as a light-emitting element.

In order to extract light emitted from the light-emitting element, at least one of a pair of electrodes may be transparent. A transistor and a light-emitting element are formed over a substrate, and the light-emitting element has a top-emission structure in which light emission is extracted from the side opposite to the substrate, a bottom-emission structure in which light emission is extracted from the substrate side, or a dual-emission structure in which light emission is extracted from both surfaces of the substrate; and a light-emitting element with any of these emission structures can be used.

FIG. 10(B) illustrates an example of the pixel unit 131 including a light-emitting element as a display element. A light-emitting element 4513 which is a display element is electrically connected to the transistor 4010 provided in the pixel unit 131. The structure of the light-emitting element 4513 is a stacked-layer structure of the first electrode layer 4030, a light-emitting layer 4511, and the second electrode layer 4031; but the structure is not limited thereto. The structure of the light-emitting element 4513 can be changed as appropriate in accordance with the direction in which light is extracted from the light-emitting element 4513, for example.

The partition wall 4510 is formed using an organic insulating material or an inorganic insulating material. It is particularly preferable that, using a photosensitive resin material, an opening portion be formed over the first electrode layer 4030 so that a side surface of the opening portion is formed to be an inclined surface having continuous curvature.

The light-emitting layer 4511 may be formed using a single layer or a plurality of layers stacked.

The emission color of the light-emitting element 4513 can be changed to white, red, green, blue, cyan, magenta, yellow, or the like depending on the material forming the light-emitting layer 4511.

Methods of achieving color display include a method in which the light-emitting element 4513 having white emission color is combined with a coloring layer, and a method in which light-emitting element 4513 with different emission color is provided in each pixel. The former method is more productive than the latter method. In the latter method, the light-emitting layer 4511 needs to be separately formed in every pixel, hence it has lower productivity than the former method. However, the latter method can obtain light emission with higher color purity than the former method. In addition to the latter method, when the light-emitting element 4513 is provided with a microcavity structure, the color purity can be further increased.

The light-emitting layer 4511 may contain an inorganic compound such as a quantum dot. For example, by using the quantum dot for the light-emitting layer the quantum dot can serve as a light-emitting material.

A protective layer may be formed over the second electrode layer 4031 and the partition wall 4510 to prevent entry of oxygen, hydrogen, moisture, carbon dioxide, and the like into the light-emitting element 4513. For the protective layer, silicon nitride, silicon nitride oxide, aluminum oxide, aluminum nitride, aluminum oxynitride, aluminum nitride oxide, DLC (Diamond Like Carbon), or the like can be formed. In a space that is sealed by the first substrate 4001, the second substrate 4006, and the sealant 4005, a filler 4514 is provided for sealing. In this manner, it is preferable that packaging (sealing) be performed with a protective film (such as a laminate film or an ultraviolet curable resin film) or a cover material with high air-tightness and little degasification to prevent exposure to outside air.

As the filler 4514, besides an inert gas such as nitrogen or argon, an ultraviolet curable resin or a thermosetting resin can be used; and PVC (polyvinyl chloride), an acrylic resin, polyimide, an epoxy resin, a silicone resin, PVB (polyvinyl butyral), EVA (ethylene vinyl acetate), or the like can be used. In addition, a drying agent may be contained in the filler 4514.

For the sealant 4005, a glass material such as a glass frit or a curable resin that is cured at room temperature such as a two-component-mixture-type resin, a light curable resin, or a thermosetting resin can be used as a resin material. In addition, a drying agent may be contained in the sealant 4005.

In addition, if necessary, an optical film such as a polarizing plate, a circularly polarizing plate (including an elliptically polarizing plate), a retardation plate ($\lambda/4$ plate or $\lambda/2$ plate), or a color filter may be provided as appropriate on a light-emitting surface of the light-emitting element. Furthermore, the polarizing plate or the circularly polarizing plate may be provided with an anti-reflection film. For example, anti-glare treatment that can reduce glare by diffusing reflected light with projections and depressions on a surface can be performed.

When the light-emitting element has a microcavity structure, light with high color purity can be extracted. Furthermore, when a microcavity structure and a color filter are used in combination, glare can be reduced and visibility of a displayed image can be increased.

The first electrode layer and the second electrode layer (each of which may also be referred to as a pixel electrode layer, a common electrode layer, a counter electrode layer, or the like) for applying voltage to the display element may have light-transmitting properties or light-reflecting properties depending on the direction in which light is extracted, the position where the electrode layer is provided, and the pattern structure of the electrode layer.

For the first electrode layer 4030 and the second electrode layer 4031, a light-transmitting conductive material such as an indium oxide containing tungsten oxide, an indium zinc oxide containing tungsten oxide, an indium oxide containing titanium oxide, an indium tin oxide, an indium tin oxide containing titanium oxide, an indium zinc oxide, or an indium tin oxide to which silicon oxide is added can be used.

The first electrode layer 4030 and the second electrode layer 4031 can be formed using one or more kinds of metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and metal nitrides thereof.

The first electrode layer 4030 and the second electrode layer 4031 can be formed using a conductive composition including a conductive high molecule (also referred to as a conductive polymer). As the conductive high molecule, a so-called π-electron conjugated conductive high molecule can be used. For example, polyaniline or a derivative thereof, polypyrrole or a derivative thereof, polythiophene or a derivative thereof, a copolymer or a copolymer of two or more kinds of aniline, pyrrole, and thiophene, or a derivative thereof, and the like can be given.

Since the transistor is easily destroyed by static electricity or the like, a protection circuit for protecting the driver circuit is preferably provided. The protection circuit is preferably formed using a nonlinear element.

This embodiment can be implemented in an appropriate combination with any of the configurations described in the other embodiments.

Embodiment 3

In this embodiment, an example of a transistor that can be used in the display unit 130 and the like of one embodiment of the present invention will be described using drawings.

The display unit 130 and the like of one embodiment of the present invention can be fabricated using a transistor of various forms, such as a bottom-gate transistor or a top-gate transistor. For example, a planar transistor or a staggered transistor may be used. Therefore, the material for the semiconductor layer to be used or the structure of the transistor can be easily changed in accordance with the existing production line.

[Bottom-Gate Transistor]

FIG. 11(A1) is a cross-sectional view of a channel-protective transistor 310 which is a kind of bottom-gate transistor. In FIG. 11(A1), the transistor 310 is formed over a substrate 371. The transistor 310 includes an electrode 322 over the substrate 371 with an insulating layer 372 provided therebetween. The transistor 310 also includes a semiconductor layer 324 over the electrode 322 with an insulating layer 326 interposed therebetween. The electrode 322 can function as a gate electrode. The insulating layer 326 can function as a gate insulating layer.

The transistor 310 includes an insulating layer 327 over a channel formation region of the semiconductor layer 324. The transistor 310 includes an electrode 344a and an electrode 344b over the insulating layer 326 and which are partly in contact with the semiconductor layer 324. The electrode 344a can function as one of a source electrode or a drain electrode. The electrode 344b can function as the other of the source electrode or the drain electrode. Part of the electrode 344a and part of the electrode 344b are formed over the insulating layer 327.

The insulating layer 327 can function as a channel protective layer. With the insulating layer 327 provided over the channel formation region, the semiconductor layer 324 can be prevented from being exposed at the time of forming the electrode 344a and the electrode 344b. Thus, the channel formation region in the semiconductor layer 324 can be prevented from being etched at the time of forming the electrode 344a and the electrode 344b.

The transistor 310 includes an insulating layer 328 over the electrode 344a, the electrode 344b, and the insulating layer 327, and an insulating layer 329 over the insulating layer 328.

In the case where a semiconductor such as silicon is used for the semiconductor layer 324, a layer that functions as an n-type semiconductor or a p-type semiconductor is preferably provided between the semiconductor layer 324 and the electrode 344a and between the semiconductor layer 324 and the electrode 344b. The layer that functions as an n-type semiconductor or a p-type semiconductor can function as the source region or the drain region of the transistor.

The insulating layer 329 is preferably formed using a material that has a function of preventing or reducing diffusion of impurities into the transistor from the outside. Note that the insulating layer 329 can also be omitted when necessary.

A transistor 311 illustrated in FIG. 11(A2) is different from the transistor 310 in that an electrode 323 that can function as a back gate electrode is provided over the insulating layer 329. The electrode 323 can be formed using a material and a method that are similar to those of the electrode 322.

In general, a back gate electrode is formed using a conductive layer and positioned such that the channel formation region of the semiconductor layer is interposed between a gate electrode and a back gate electrode. Thus, the back gate electrode can function in a manner similar to that of the gate electrode. The potential of the back gate electrode may be the same as the potential of the gate electrode or may be a ground potential (GND potential) or an arbitrary potential. Furthermore, by changing the potential of the back gate electrode independently of that of the gate electrode, the threshold voltage of the transistor can be changed.

Both the electrode 322 and the electrode 323 can function as a gate electrode. Thus, the insulating layer 326, the insulating layer 328, and the insulating layer 329 can each function as a gate insulating layer. Note that the electrode 323 may also be provided between the insulating layer 328 and the insulating layer 329.

In the case where one of the electrode 322 and the electrode 323 is referred to as a "gate electrode", the other is referred to as a "back gate electrode". For example, in the transistor 311, in the case where the electrode 323 is referred to as a "gate electrode", the electrode 322 is referred to as a "back gate electrode". In the case where the electrode 323 is used as a "gate electrode", the transistor 311 can be considered as a kind of top-gate transistor. Alternatively, one of the electrode 322 and the electrode 323 may be referred to as a "first gate electrode", and the other may be referred to as a "second gate electrode".

By providing the electrode 322 and the electrode 323 with the semiconductor layer 324 provided therebetween and setting the potentials of the electrode 322 and the electrode 323 to be the same, a region in the semiconductor layer 324 in which the carriers flow is enlarged in the film thickness direction; thus, the amount of carriers transferred is increased. As a result, as the on-state current of the transistor 311 increases, the field-effect mobility becomes higher.

Therefore, the transistor 311 is a transistor that has a large on-state current for the area occupied thereby. That is, the area occupied by the transistor 311 can be reduced for the required on-state current.

The gate electrode and the back gate electrode are formed using conductive layers and thus they have a function of preventing an electric field generated outside the transistor from affecting the semiconductor layer in which the channel is formed (in particular, an electric field blocking function against static electricity and the like). Note that when the back gate electrode is formed larger than the semiconductor layer to cover the semiconductor layer with the back gate electrode, the electric field blocking function can be enhanced.

Since the gate electrode and the back gate electrode each have a function of blocking an electric field from the outside, charge of the charged particle and the like generated above and below the transistor does not affect the channel formation region of the semiconductor layer. Thus, deterioration in a stress test (e.g., an NGBT (Negative Gate Bias-Temperature) stress test (also referred to as "NBT" or "NBTS") in which a negative voltage is applied to the gate) can be inhibited. Furthermore, the gate electrode and the back gate electrode can block an electric field generated by the drain electrode from affecting the semiconductor layer. Thus, changes in the rising voltage of on-state current due to changes in drain voltage can be inhibited. Note that this effect is significantly generated when a potential is supplied to the gate electrode and the back gate electrode.

The transistor including the back gate electrode has a small change in threshold voltage before and after PGBT (Positive Gate Bias-Temperature) stress test (also referred to as "PBT" or "PBTS"), in which a positive voltage is applied to a gate, compared to a transistor with no back gate electrode.

A BT stress test such as NGBT and PGBT is a kind of accelerated test and can measure a change in transistor characteristics due to long-term use (change over time) in a short time. In particular, the amount of change in the threshold voltage of the transistor before and after the BT stress test is an important indicator when examining the reliability of the transistor. If the amount of change in the threshold voltage before and after the BT stress test is smaller, the transistor can be said to have a higher reliability.

By having a gate electrode and a back gate electrode and setting them to have the same potential, the amount of change in the threshold voltage is reduced. Accordingly, variation in electrical characteristics among a plurality of transistors is also reduced.

In the case where light enters from the back gate electrode side, when the back gate electrode is formed using a light-blocking conductive film, light can be prevented from entering the semiconductor layer from the back gate electrode side. Therefore, photodegradation of the semiconductor layer can be prevented and deterioration in electrical characteristics of the transistor, such as a shift in the threshold voltage, can be prevented.

By adopting the configuration described in this embodiment, a highly reliable transistor can be achieved.

In FIG. 11(B1), the cross-sectional view of a channel protective transistor 320 that is a type of bottom-gate transistor is illustrated. The transistor 320 has substantially the same structure as the transistor 310 but is different in that the insulating layer 327 covers the semiconductor layer 324. The semiconductor layer 324 is and the electrode 344a are electrically connected to each other in an opening formed by selectively removing part of the insulating layer 327 which overlaps with the semiconductor layer 324. The semiconductor layer 324 is electrically connected to the electrode 344b in another opening formed by selectively removing part of the insulating layer 327 which overlaps with the semiconductor layer 324. A region of the insulating layer 327 that overlaps with the channel formation region can function as a channel protective layer.

A transistor 321 illustrated in FIG. 11(B2) is different from the transistor 320 in that the electrode 323 that can function as a back gate electrode is provided over the insulating layer 329.

By providing the insulating layer 327, the semiconductor layer 324 can be prevented from being exposed at the time of forming the electrode 344a and the electrode 344b. Thus, the semiconductor layer 324 can be prevented from being reduced in thickness at the time of forming the electrode 344a and the electrode 344b.

The distance between the electrode 344a and the electrode 322 and the distance between the electrode 344b and the electrode 322 are longer in the transistor 320 and the transistor 321 than in the transistor 310 and the transistor 311. Thus, the parasitic capacitance generated between the electrode 344a and the electrode 322 can be reduced. In addition, the parasitic capacitance generated between the electrode 344b and the electrode 322 can be reduced.

A transistor 325 illustrated in FIG. 11(C1) is a channel-etched transistor that is a type of bottom-gate transistor. In the transistor 325, the electrode 344a and the electrode 344b are formed without using the insulating layer 327. Thus, part of the semiconductor layer 324 that is exposed at the time of forming the electrode 344a and the electrode 344b is etched in some cases. However, since the insulating layer 327 is not provided, the productivity of the transistor can be increased.

A transistor 326 illustrated in FIG. 11(C2) is different from the transistor 325 in that the electrode 323 which can function as a back gate electrode is provided over the insulating layer 329.

[Top-Gate Transistor]

FIG. 12(A1) is a cross-sectional view of a transistor 330 which is a type of top-gate transistor. The transistor 330 includes the semiconductor layer 324 over the insulating layer 372, the electrode 344a in contact with part of the semiconductor layer 324 and the electrode 344b in contact with part of the semiconductor layer 324, which are over the semiconductor layer 324 and the insulating layer 372, the insulating layer 326 over the semiconductor layer 324, the electrode 344a and the electrode 344b, and the electrode 322 over the insulating layer 326.

In the transistor 330, since the electrode 322 does not overlap with the electrode 344a and the electrode 344b, the parasitic capacitance generated between the electrode 322 and the electrode 344a and the parasitic capacitance generated between the electrode 322 and the electrode 344b can be reduced. After the formation of the electrode 322, an impurity 255 is introduced into the semiconductor layer 324 using the electrode 322 as a mask, so that an impurity region can be formed in the semiconductor layer 324 in a manner of self-alignment (see FIG. 12(A3)).

The impurity 255 can be introduced with an ion implantation apparatus, an ion doping apparatus, or a plasma treatment apparatus.

As the impurity 255, for example, at least one kind of element among Group 13 elements or Group 15 elements can be used. In the case where an oxide semiconductor is used for the semiconductor layer 324, it is possible to use at least one kind of element among a rare gas, hydrogen, and nitrogen as the impurity 255.

A transistor 331 illustrated in FIG. 12(A2) is different from the transistor 330 in that the electrode 323 and an insulating layer 227 are included. The transistor 331 includes the electrode 323 formed over the insulating layer 372 and the insulating layer 227 formed over the electrode 323. The electrode 323 can function as a back gate electrode. The insulating layer 227 can function as a gate insulating layer. The insulating layer 227 can be formed using a material and a method similar to those of the insulating layer 326.

Similar to the transistor 311, the transistor 331 has a high on-state current for its occupied area. That is, the area occupied by the transistor 331 can be reduced for the required on-state current.

A transistor 340 illustrated in FIG. 12(B1) is a type of top-gate transistor. The transistor 340 is different from the transistor 330 in that the semiconductor layer 324 is formed after the formation of the electrode 344a and the electrode 344b. A transistor 341 illustrated in FIG. 12(B2) is different from the transistor 340 in that the electrode 323 and the insulating layer 227 are included. In the transistor 340 and the transistor 341, part of the semiconductor layer 324 is formed over the electrode 344a and another part of the semiconductor layer 324 is formed over the electrode 344b.

Similar to the transistor 311, the transistor 341 has a high on-state current for its occupied area. That is, the area occupied by the transistor 341 can be reduced for the required on-state current.

A transistor 342 illustrated in FIG. 13(A1) is a type of top gate transistor. The transistor 342 is different from the transistor 330 and the transistor 340 in that the electrode 344a and the electrode 344b are formed after the formation of the insulating layer 329. The electrode 344a and the electrode 344b are electrically connected to the semiconductor layer 324 through openings formed in the insulating layer 328 and the insulating layer 329.

Part of the insulating layer 326 that does not overlap with the electrode 322 is removed, and the impurity 255 is introduced into the semiconductor layer 324 using the electrode 322 and the remaining insulating layer 326 as masks, so that an impurity region can be formed in the semiconductor layer 324 in a manner of self-alignment (see FIG. 13(A3)). The transistor 342 includes a region where the insulating layer 326 extends beyond an end portion of the electrode 322. When introducing the impurity 255 to the semiconductor layer 324, the impurity concentration of the region of the semiconductor layer 324 to which the impurity 255 is introduced through the insulating layer 326 is smaller than that of the region which the impurity 255 is introduced not through the insulating layer 326. Thus, an LDD (Lightly Doped Drain) region is formed in a region of the semiconductor layer 324 which does not overlap with the electrode 322.

A transistor 343 illustrated in FIG. 13(A2) is different from the transistor 342 in that the electrode 323 is included. The transistor 343 includes the electrode 323 that is formed over the substrate 371 and overlaps with the semiconductor layer 324 with the insulating layer 372 provided therebetween. The electrode 323 can function as a back gate electrode.

As in a transistor 344 illustrated in FIG. 13(B1) and a transistor 345 illustrated in FIG. 13(B2), the region in insulating layer 326 that does not overlap with the electrode 322 may be completely removed. Alternatively, as in a transistor 346 illustrated in FIG. 13(C1) and a transistor 347 illustrated in FIG. 13(C2), the insulating layer 326 may be left behind.

Also in the transistor 342 to the transistor 347, after the formation of the electrode 322, the impurity 255 is introduced into the semiconductor layer 324 using the electrode 322 as a mask, so that an impurity region can be formed in the semiconductor layer 324 in a self-aligned manner.

[Substrate]

There is no particular limitation on the material used for the substrate. The material may be determined considering whether it has or does not have light-transmitting properties or it has heat resistance that can withstand heat treatment. For example, a glass substrate of barium borosilicate glass and aluminoborosilicate glass, or the like, a ceramic substrate, a quartz substrate, a sapphire substrate, or the like can be used. Alternatively, a semiconductor substrate, a flexible substrate, an attachment film, a base film, or the like may be used.

Examples of the semiconductor substrate include a semiconductor substrate containing a material such as silicon or germanium and a compound semiconductor substrate containing a material such as silicon carbide, silicon germanium, gallium arsenide, indium phosphide, zinc oxide, or gallium oxide. The semiconductor substrate may be a single crystal semiconductor or a polycrystalline semiconductor.

Moreover, as a substrate, a large-sized glass substrate of the 6th generation (1500 mm×1850 mm), the 7th generation (1870 mm×2200 mm), the 8th generation (2200 mm×2400 mm), the 9th generation (2400 mm×2800 mm), or the 10th generation (2950 mm×3400 mm), for example, can be used. Thus, a large-sized display device can be fabricated. When the substrate is made larger, more display devices can be produced from one substrate, which leads to a reduction in production cost.

To increase the flexibility of the display unit 130, a flexible substrate, an attachment film, a base film, or the like may be used as a substrate.

For the material of the flexible substrate, the attachment film, the base film, or the like, a polyester resin such as polyethylene terephthalate (PET) or polyethylene naphthalate (PEN), a polyacrylonitrile resin, an acrylic resin, a polyimide resin, a polymethyl methacrylate resin, a polycarbonate (PC) resin, a polyethersulfone (PES) resin, a polyamide resin (e.g., nylon or aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, or cellulose nanofiber can be used, for example.

When any of the above-described materials is used for the substrate, a lightweight display device can be provided. Furthermore, when any of the above-described materials is used for the substrate, a shock-resistant display device can be provided. When any of the above-described materials is used for the substrate, a display device that is less likely to be broken can be provided.

The flexible substrate used as the substrate preferably has a lower coefficient of linear expansion because deformation due to an environment is suppressed. For the flexible substrate used as the substrate, for example, a material whose coefficient of linear expansion is lower than or equal to $1\times10^{-3}$/K, lower than or equal to $5\times10^{-5}$/K, or lower than or equal to $1\times10^{-5}$/K is used. In particular, aramid is suitable for the flexible substrate because of its low coefficient of linear expansion.

[Conductive Layer]

As a conductive material that can be used for the gate, the source, and the drain of the transistor, and the conductive layers of wirings, electrodes or the like included in the display device, a metal element selected from aluminum (Al), chromium (Cr), copper (Cu), silver (Ag), gold (Au), platinum (Pt), tantalum (Ta), nickel (Ni), titanium (Ti), molybdenum (Mo), tungsten (W), hafnium (H), vanadium (V), niobium (Nb), manganese (Mn), magnesium (Mg), zirconium (Zr), beryllium (Be), and the like, an alloy containing any of the above metal elements as a component, an alloy containing a combination of the above metal elements, or the like can be used. Furthermore, a semiconductor typified by polycrystalline silicon containing an impurity element such as phosphorus, or silicide such as nickel silicide may be used. There is no particular limitation on the formation method of the conductive material, and a variety of formation methods such as an evaporation method, a CVD method, a sputtering method, and a spin coating method can be employed.

A Cu—X alloy (X is Mn, Ni, Cr, Fe, Co, Mo, Ta, or Ti) may be used for the conductive material. The layer formed with a Cu—X alloy enables fabrication costs to be inhibited because processing can be performed by a wet etching process. Alternatively, an aluminum alloy containing one or more of the elements selected from titanium, tantalum, tungsten, molybdenum, chromium, neodymium, and scandium may be used for the conductive material.

As the conductive material that can be used for the conductive layer, a conductive material containing oxygen, such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added can also be used. Furthermore, a conductive material containing nitrogen, such as titanium nitride, tantalum nitride, or tungsten nitride, can be used. The conductive layer can have a stacked-layer structure with an appropriate combination of a conductive material containing oxygen, a conductive material containing nitrogen, and a conductive material containing the above-described metal element.

For example, the conductive layer can have a single-layer structure of an aluminum film including silicon, a two-layer structure in which a titanium layer is stacked over an aluminum layer, a two-layer structure in which a titanium layer is stacked over a titanium nitride layer, a two-layer structure in which a tungsten layer is stacked over a titanium nitride layer, a two-layer structure in which a tungsten layer is stacked over a tantalum nitride layer, or a three-layer structure of a titanium layer, an aluminum layer stacked over the titanium layer, and a titanium layer further stacked thereover.

Furthermore, a plurality of conductive layers formed with the above conductive materials may be stacked and used. For example, the conductive layer can have a stacked-layer structure combining a material containing the above metal element and a conductive material containing oxygen. The conductive layer can also have a stacked-layer structure combining a material containing the above metal element and a conductive material containing nitrogen. The conductive layer can also have a stacked-layer structure combining a material containing the above metal element, a conductive material containing oxygen, and a conductive material containing nitrogen.

For example, the conductive layer can have a three-layer structure in which a conductive layer containing copper is stacked over a conductive layer containing oxygen and at least one of indium and zinc, and a conductive layer containing oxygen and at least one of indium and zinc further stacked thereover. In this case, the side surface of the conductive layer containing copper is preferably covered with the conductive layer containing oxygen and at least one of indium and zinc. In addition, for example, a plurality of conductive layers containing oxygen and at least one of indium and zinc may be stacked and used.

[Insulating Layers]

As each insulating layer, a single layer or a stacked layer of a material selected from aluminum nitride, aluminum oxide, aluminum nitride oxide, aluminum oxynitride, magnesium oxide, silicon nitride, silicon oxide, silicon nitride oxide, silicon oxynitride, gallium oxide, germanium oxide, yttrium oxide, zirconium oxide, lanthanum oxide, neodymium oxide, hafnium oxide, tantalum oxide, aluminum silicate, and the like is used. Furthermore, a material in which more than one of the materials selected from an oxide material, a nitride material, an oxynitride material, and a nitride oxide material are mixed may be used.

Note that in this specification, a nitride oxide refers to a compound in which the nitrogen content is higher than the oxygen content. Furthermore, an oxynitride refers to a compound in which the oxygen content is higher than the nitrogen content. Note that the content of each element can be measured by RBS (Rutherford Backscattering Spectrometry), for example.

It is particularly preferable that the insulating layer 372 and the insulating layer 329 be formed using an insulating material that does not allow impurities to permeate easily. For example, a single layer or a stacked layer of an insulating material containing boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum is used. As examples of an insulating material that does not allow impurities to permeate easily, aluminum oxide, aluminum nitride, aluminum oxynitride, aluminum nitride oxide, gallium oxide, germanium oxide, yttrium oxide, zirconium oxide, lanthanum oxide, neodymium oxide, hafnium oxide, tantalum oxide, and silicon nitride can be given.

When an insulating material that does not allow impurities to permeate easily is used for the insulating layer 372, impurity diffusion from the substrate 371 side can be suppressed, and the reliability of the transistor can be improved. When the insulating material that does not allow impurities to permeate easily is used for the insulating layer 329, impurity diffusion from above the insulating layer 329 can be inhibited, and the reliability of the transistor can be improved.

As the insulating layer, an insulating layer that can serve as a planarization layer may be used. As an insulating layer that can serve as a planarization layer, a heat-resistant organic material such as polyimide, acrylic resin, benzocyclobutene resin, polyamide, or epoxy resin can be used. Other than the above-described organic materials, it is also possible to use a low-dielectric constant material (a low-k material), a siloxane-based resin, PSG (phosphosilicate glass), BPSG (borophosphosilicate glass), or the like. Note that a plurality of insulating layers formed of these materials may be stacked.

Note that the siloxane-based resin corresponds to a resin including a Si—O—Si bond formed using a siloxane-based material as a starting material. The siloxane-based resin may include an organic group (e.g., an alkyl group or an aryl group) or a fluoro group as a substituent. The organic group may include a fluoro group.

A surface of the insulating layer or the like may be subjected to CMP treatment. By performing the CMP treatment, unevenness of a sample surface can be reduced, so that coverage with an insulating layer and a conductive layer to be formed later can be increased.

[Semiconductor Layer]

As a semiconductor material used for a semiconductor layer of a transistor, either an amorphous semiconductor or a semiconductor having crystallinity (a microcrystalline semiconductor, a polycrystalline semiconductor, a single crystal semiconductor, or a semiconductor partly including a crystal region) may be used.

For example, silicon, germanium, or the like can be used as a semiconductor material used for the semiconductor layer of the transistor. Furthermore, a compound semiconductor such as silicon carbide, gallium arsenide, a metal oxide, or a nitride semiconductor, an organic semiconductor, or the like can be used.

For example, amorphous silicon can be used as a semiconductor material used for the transistor. In particular, amorphous silicon has high mass productivity and can be easily provided over a large-sized substrate. Note that the amorphous silicon used in the transistor generally contains a large amount of hydrogen. Thus, the amorphous silicon containing a large amount of hydrogen may be called "hydrogenated amorphous silicon" or "a-Si:H". Amorphous silicon can be formed at a temperature lower than a temperature at which polycrystalline silicon is formed; thus, the highest temperature in a manufacturing process can be lowered. Therefore, materials with low heat resistance can be used for a substrate, a conductive layer, an insulating layer, and the like.

Alternatively, silicon having crystallinity, such as microcrystalline silicon, polycrystalline silicon, or single crystal silicon, can be used as the semiconductor material used for the transistor. In particular, polycrystalline silicon can be formed at a lower temperature than a temperature at which single crystal silicon is formed and has higher field-effect mobility and higher reliability than amorphous silicon.

Furthermore, an oxide semiconductor, which is a kind of a metal oxide, can be used as a semiconductor material used for the transistor. Typically, an oxide semiconductor containing indium, or the like can be used. An oxide semiconductor can achieve higher field-effect mobility and higher reliability than amorphous silicon. Moreover, an oxide semiconductor has high mass productivity and can be easily provided over a large-sized substrate.

An oxide semiconductor, which is a kind of metal oxide, has a wider bandgap and lower carrier density than silicon; and thus is preferably used for the semiconductor layer of the transistor. The use of an oxide semiconductor for the semiconductor layer of the transistor is preferable because current flowing between a source and a drain of the transistor in an off state can be reduced.

An oxide semiconductor, which is a kind of a metal oxide, preferably has an energy gap of 2 eV or more, further preferably 2.5 eV or more, still further preferably 3 eV or more. The use of such an oxide semiconductor having a wide energy gap can reduce the off-state current of the transistor.

The oxide semiconductor, which is a kind of a metal oxide, preferably contains, for example, a material represented by an In-M-Zn-based oxide that contains at least indium, zinc, and M (a metal such as aluminum, titanium, gallium, germanium, yttrium, zirconium, lanthanum, cerium, tin, neodymium, or hafnium). In order to reduce variations in electrical characteristics of the transistor using the oxide semiconductor, a stabilizer is preferably contained in addition to them.

Examples of the stabilizer, including the metals that are described above as M, are gallium, tin, hafnium, aluminum, and zirconium. Other examples of the stabilizer include lanthanoid such as lanthanum, cerium, praseodymium, neodymium, samarium, europium, gadolinium, terbium, dysprosium, holmium, erbium, thulium, ytterbium, and lutetium.

As a metal oxide forming the semiconductor layer, an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used, for example.

Note that here, an In—Ga—Zn-based oxide means an oxide containing In, Ga, and Zn as its main components and there is no limitation on the ratio of In to Ga to Zn. Furthermore, a metal element other than In, Ga, and Zn may be contained.

[Formation Methods of Various Layers]

Conductive layers for forming insulating layers, semiconductor layers, electrodes, and wirings can be formed by a sputtering method, a Chemical Vapor Deposition (CVD) method, a vacuum evaporation method, a Pulsed Laser Deposition (PLD) method, an Atomic Layer Deposition (ALD) method, or the like. As the CVD method, a plasma-enhanced chemical vapor deposition (PECVD) method or a thermal CVD method may be used. As an example of the thermal CVD method, a Metal Organic CVD (MOCVD) method may be used.

Alternatively, conductive layers for forming insulating layers, semiconductor layers, electrodes, and wirings that configure the display device can be formed by a method such as spin coating, dipping, spray coating, ink jetting, dispensing, screen printing, offset printing, slit coating, roll coating, curtain coating, or knife coating.

By a PECVD method, a high-quality film can be obtained at a relatively low temperature. With the use of a film deposition method that does not use plasma at the time of film deposition such as an MOCVD method, an ALD method, or a thermal CVD method, the formation surface is not easily damaged. For example, a wiring, an electrode, an element (e.g., a transistor or a capacitor), or the like included in a transistor is charged up by receiving charges from plasma in some cases. In that case, accumulated charges might break the wiring, electrode, element, or the like included in the transistor. Conversely, such plasma damage is not caused in the case of using a deposition method that does not use plasma, and thus the yield of a transistor can be increased. Furthermore, as there is no plasma damage during deposition, a film with few defects can be obtained.

Unlike a deposition method in which particles ejected from a target or the like are deposited, a CVD method and an ALD method are deposition methods in which a film is formed by reaction at a surface of an object. Thus, a CVD method and an ALD method are deposition methods that are less likely to be influenced by the shape of an object and thus have favorable step coverage. In particular, an ALD method has excellent step coverage and excellent thickness uniformity, and thus is suitable for the case of covering a surface of an opening with a high aspect ratio, for example. On the other hand, an ALD method has a relatively low deposition rate, and thus is preferably used in combination with another deposition method with a high deposition rate such as a CVD method in some cases.

A CVD method or an ALD method enables control of composition of a film to be obtained with a flow rate ratio of the source gases. For example, in a CVD method or an ALD method, a film with a desired composition can be deposited by adjusting the flow ratio of the source gases. Moreover, by a CVD method or an ALD method, by changing the flow ratio of the source gases during the deposition, a film whose composition is continuously changed can be deposited. In the case of depositing while changing the flow ratio of the source gases, as compared with the case of depositing with the use of a plurality of deposition chambers, time taken for the deposition can be shortened because time taken for transfer and pressure adjustment is omitted. Thus, the productivity of the transistor can be increased in some cases.

When layers (thin films) included in the display device are processed, a photolithography method or the like can be used for the processing. Alternatively, island-shaped layers may be formed by a deposition method using a blocking mask. Alternatively, a nanoimprinting method, a sandblasting method, a lift-off method, or the like may be used for the processing of the layers. Examples of the photolithography method include a method in which a resist mask is formed over a layer (thin film) to be processed, part of the layer (thin film) is selectively removed using the resist mask as a mask, after which the resist mask is removed, and a method in which a photosensitive layer is formed and then exposed to light and developed to be processed into a desired shape.

In the case of using light in a photolithography method, an i-line (a wavelength of 365 nm), a g-line (a wavelength of 436 nm), and an h-line (a wavelength of 405 nm), or light combining any of them can be used for light exposure. Ultraviolet light, KrF laser light, ArF laser light, or the like can also be used. Furthermore, light exposure may be performed with liquid immersion exposure technique. Furthermore, as the light used for the light exposure, Extreme Ultra-violet (EUV) light or X-rays may be used. Furthermore, instead of the light used for the light exposure, an electron beam can also be used. It is preferable to use Extreme Ultra-violet light, X-rays, or an electron beam because extremely minute processing can be performed. Note that in the case of performing light exposure by scanning of a beam such as an electron beam, a photomask is not needed.

For removal (etching) of the layers (thin films), a dry etching method, a wet etching method, a sandblasting method, or the like can be used. These etching methods may be employed in combination.

This embodiment can be implemented in an appropriate combination with any of the structures described in the other embodiments.

Embodiment 4

One embodiment of the present invention can be used for a variety of electronic devices having a display unit. Examples of an electronic device that can use one embodiment of the present invention include display devices such as televisions and monitors, desktop-type or notebook-type personal computers, word processors, image playback devices that playback still images or videos stored in storage media such as DVD (Digital Versatile Disc), portable game consoles, tablet terminals, large game machines such as pachinko machines, portable information terminals, electronic notebooks, e-book readers, video cameras, and digital still cameras.

FIG. 14 illustrates examples of electronic devices using the display device related to one embodiment of the present invention.

Figure 14A:
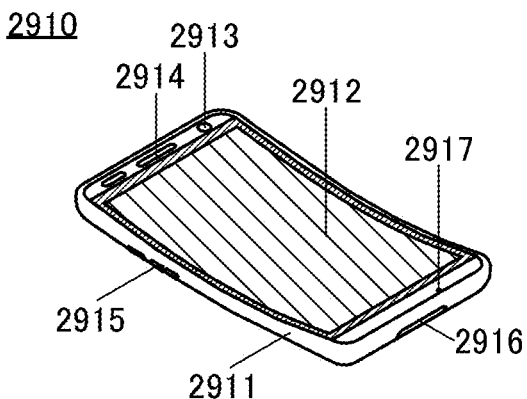
FIG. 14 Diagrams illustrating structural examples of electronic devices.

An information terminal 2910 illustrated in FIG. 14(A) includes a housing 2911, a display unit 2912, a microphone 2917, a speaker unit 2914, a camera 2913, an external connection unit 2916, an operation switch 2915, and the like. The display unit 2912 is provided with a display panel and a touch screen that use a flexible substrate. In addition, a calculation processing device, a display unit, and the like are provided in the housing 2911. The information terminal 2910 can be used as, for example, a smartphone, a mobile phone, a tablet information terminal, a tablet personal computer, or an e-book reader.

Figure 14B:
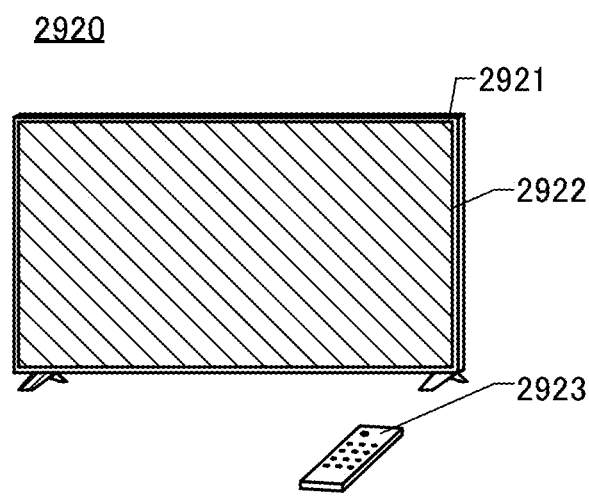

A television 2920 illustrated in FIG. 14(B) includes a housing 2921, a display unit 2922, a remote controller 2923, and the like. In addition, a calculation processing device, a display unit, and the like are provided in the housing 2921.

Figure 14C:
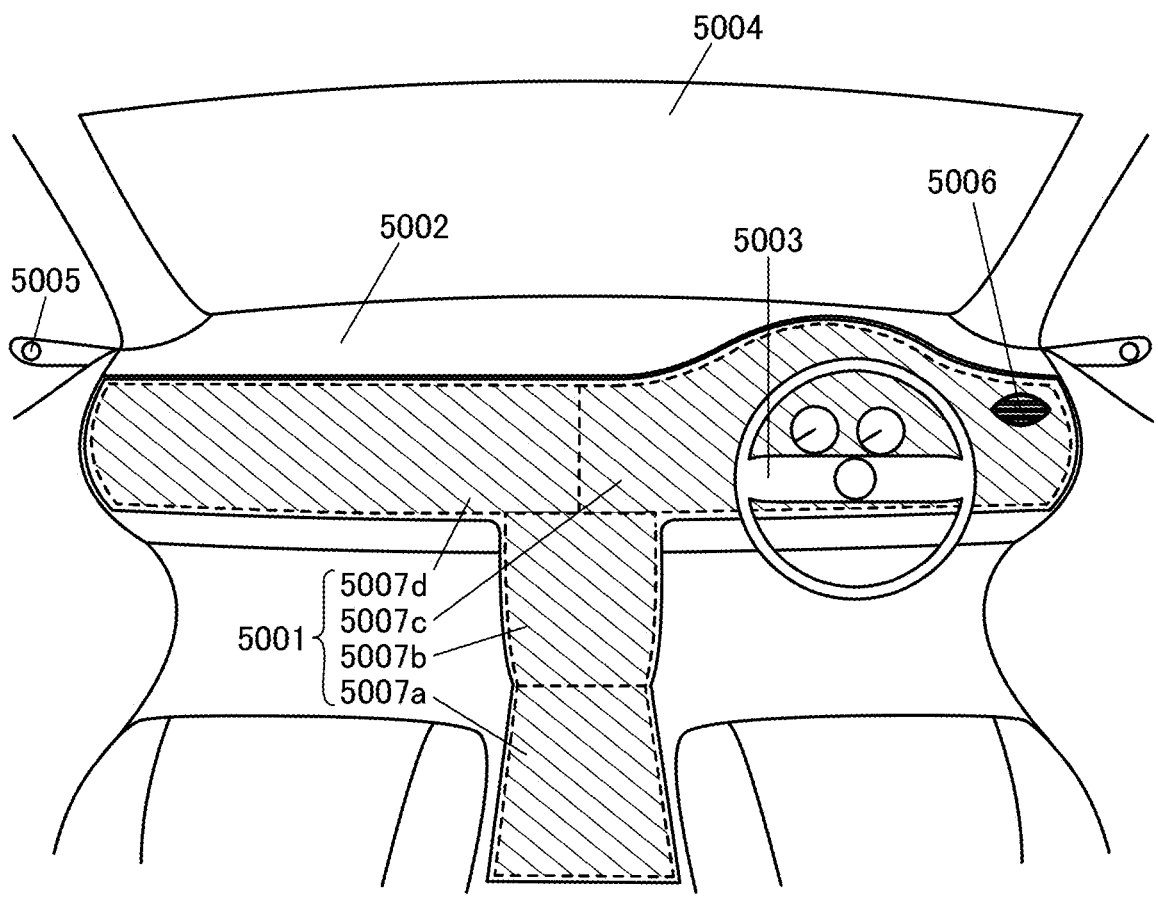

FIG. 14(C) illustrates a configuration example of a vehicle equipped with a display unit 5001. One embodiment of the present invention can be used in the display unit 5001 of the vehicle. Note that although FIG. 14(C) shows an example in which the display unit 5001 is installed in a right-hand drive vehicle, the example is not particularly limited thereto and installation in a left-hand drive vehicle is also possible. In that case, the left and right of the components arranged in FIG. 14(C) are reversed.

FIG. 14(C) illustrates a dashboard 5002, a steering wheel 5003, a windshield 5004, and the like that are arranged around a driver's seat and a front passenger's seat. Furthermore, a calculation processing device, a display unit, and the like are provided in the dashboard 5002.

The display unit 5001 is placed in a predetermined position in the dashboard 5002, specifically, around a driver, and is substantially T-shaped. Although FIG. 14(C) illustrates an example in which one display unit 5001 formed using a plurality of display panels 5007 (display panels 5007*a*, 5007*b*, 5007*c*, and 5007*d*) is provided along the dashboard 5002, the display unit 5001 may be divided and placed in a plurality of places.

Note that the plurality of display panels 5007 may have flexibility. In this case, the display unit 5001 can be processed into a complicated shape; for example, a structure in which the display unit 5001 is provided along a curved surface of the dashboard 5002 or the like or a structure in which a display region of the display unit 5001 is not provided at a connection portion of the steering wheel, display units of meters, a ventilation duct 5006, or the like, can easily be achieved.

In addition, a plurality of cameras 5005 that capture images of the situations on the rear side may be provided outside the vehicle. Although the cameras 5005 are provided instead of side mirrors in the example illustrated in FIG. 14(C), both the side mirrors and the cameras may be provided.

As the cameras 5005, a CCD camera, a CMOS camera, or the like can be used. In addition, an infrared camera may be used in combination with such cameras. The infrared camera whose output level increases as the temperature of the object increases can detect or extract a living body such as that of a human or an animal.

An image captured with the camera 5005 can be output to any one or more of the display panels 5007. This display unit 5001 is used mainly for supporting driving of the vehicle. An image of the situation on the rear side is taken at a wide angle of view by the camera 5005, and the image is displayed on the display panels 5007 so that the driver can see a blind area to avoid an accident.

Furthermore, with one embodiment of the present invention, the image captured by the camera 5005 can have increased resolution and be displayed on the display panel 5007.

Furthermore, a distance image sensor may be provided over a roof of the vehicle, and an image obtained by the distance image sensor may be displayed on the display unit 5001. For the distance image sensor, an image sensor. LIDAR (Light Detection and Ranging), or the like can be used. An image obtained by the image sensor and the image obtained by the distance image sensor are displayed on the display unit 5001, whereby more information can be provided to the driver to support driving.

The display unit 5001 may also have a function of displaying map information, traffic information, television images, DVD images, and the like. For example, enlarged map information can be displayed on the display panels 5007a, 5007b, 5007c, and 5007d as one display screen. Note that the number of display panels 5007 can be increased depending on the image to be displayed.

Furthermore, the image displayed on the display panels 5007a, 5007b, 5007c, and 5007d can be freely set to meet the driver's preference. For example, television images or DVD images can be displayed on the display panel 5007d on the left side, map information can be displayed on the display panel 5007b at the center, meters can be displayed on the display panel 5007c on the right side, and audio information can be displayed on the display panel 5007a near a transmission gear (between the driver's seat and the front passenger's seat). In addition, a combination of the plurality of display panels 5007 can add a fail-safe function to the display unit 5001. For example, even when any one of the display panels 5007 is broken for any reason, the display region can be changed so that displaying can be performed using another display panel 5007.

This embodiment can be implemented in an appropriate combination with any of the configurations described in the other embodiments.

REFERENCE NUMERALS

HL1: intermediate layer, HL2: intermediate layer, 100: display device, 110: image processing device, 111: image data input unit, 112: image analysis unit, 113: image dividing unit, 114: circuit, 115: image calculation processing unit, 116: image synthesis unit, 117: super-resolution processing circuit, 117_n: super-resolution processing circuit, 117_N: super-resolution processing circuit, 117_1: super-resolution processing circuit, 117_2: super-resolution processing circuit, 117_3: super-resolution processing circuit, 117_5: super-resolution processing circuit, 118: neural network circuit, 119: super-resolution processing circuit, 120: signal generation circuit, 122: feature amount extraction circuit, 130: display unit, 131: pixel unit, 132: printed wiring board, 133: input terminal, 140: learning neural network device, 141: database, 142: data set, 143: teacher data, 144: learning neural network circuit, 145: image data, 146: data, 151: synapse layer, 211a: data driver, 211b: data driver, 212a: gate driver, 212b: gate driver, 227: insulating layer, 255: impurity, 310: transistor, 311: transistor, 320: transistor, 321: transistor, 322: electrode, 323: electrode, 324: semiconductor layer, 325: transistor, 326: insulating layer, 327: insulating layer, 328: insulating layer, 329: insulating layer, 330: transistor, 331: transistor, 340: transistor, 341: transistor, 342: transistor, 343: transistor, 344: transistor, 344a: electrode, 344b: electrode, 345: transistor, 346: transistor, 347: transistor, 371: substrate, 372: insulating layer, 2910: information terminal, 2911: housing, 2912: display unit, 2913: camera, 2914: speaker unit, 2915: switch, 2916: external connection unit, 2917: microphone, 2920: television, 2921: housing, 2922: display unit, 2923: remote controller, 4001: substrate, 4005: sealant, 4006: substrate, 4008: liquid crystal layer, 4010: transistor, 4011: transistor, 4013: liquid crystal element, 4014: wiring, 4015: electrode, 4017: electrode, 4018: FPC, 4019: anisotropic conductive layer, 4020: capacitor, 4021: electrode, 4030: electrode layer, 4031: electrode layer, 4032: insulating layer, 4033: insulating layer, 4035: spacer, 4041: printed circuit board, 4042: integrated circuit, 4102: insulating layer, 4103: insulating layer, 4104: insulating layer, 4110: insulating layer, 4111: insulating layer, 4112: insulating layer, 4131: coloring layer 4132: light-blocking layer, 4133: insulating layer, 4510: partition wall, 4511: light-emitting layer, 4513: light-emitting element, 4514: filler, 5001: display unit, 5002: dashboard, 5003: steering wheel, 5004: windshield, 5005: camera, 5006: ventilation duct, 5007: display panel, 5007a: display panel, 5007b: display panel, 5007c: display panel, 5007d: display panel

The invention claimed is:

1. A display device comprising:
an image analysis unit to which first image data is input;
an image dividing unit which divides the first image data into a plurality of image data; and
an image calculation processing unit which includes a plurality of super-resolution processing circuits performing different super-resolution processing, to which the first image data divided for each super-resolution processing circuit is input, and which generates a plurality of second image data,
wherein the image analysis unit is configured to obtain information of a target block in an image displayed on the basis of the first image data;
wherein the image analysis unit is further configured to control the division of the first image data by the image dividing unit for each target block; and
wherein the image analysis unit is further configured to control the input of any one of the divided first image data into any one of the plurality of super-resolution processing circuits.

2. The display device according to claim 1,
wherein the image analysis unit comprises a neural network circuit that stores a learned weight parameter, and
wherein the neural network circuit is configured to output, as output data, a signal selecting the super-resolution processing circuit to which the divided first image data including the target block is input, with the information of the target block being input data.

3. The display device according to claim 1, wherein the super-resolution processing circuit is configured to generate the second image data using any one of a Nearest neighbor method, a Bilinear method, a Bicubic method, a Lanczos method, an RAISR method, an ANR method, an A+ method, and an SRCNN method.

4. The display device according to claim 1, further comprising:
   an image synthesis unit generating third image data by synthesizing a plurality of the second image data; and
   a display unit which displays an image on the basis of the third image data,
   wherein the display unit comprises a pixel comprising a display element and a transistor, and
   wherein the display element is a liquid crystal element or a light-emitting element.

5. The display device according to claim 4, wherein the transistor is a bottom-gate transistor.

6. The display device according to claim 4, wherein a semiconductor layer of the transistor comprises amorphous silicon.

7. The display device according to claim 4, wherein 7600 or more of the pixels are placed in a row direction in the display unit and 4300 or more of the pixels are placed in a column direction in the display unit.

8. The display device according to claim 4, wherein the display unit has a diagonal of 60 inches or more.

9. A display device comprising:
   an image analysis unit to which first image data is input;
   an image dividing unit which divides the first image data into a plurality of image data; and
   an image calculation processing unit which includes a plurality of super-resolution processing circuits performing different super-resolution processing, to which the first image data divided for each super-resolution processing circuit is input, and which generates a plurality of second image data,
   wherein the image analysis unit is configured to obtain information of a target block in an image displayed on the basis of a movement vector of the first image data;
   wherein the image analysis unit is further configured to control the division of the first image data by the image dividing unit for each target block; and
   wherein the image analysis unit is further configured to control the input of any one of the divided first image data into any one of the plurality of super-resolution processing circuits.

10. The display device according to claim 9,
    wherein the image analysis unit comprises a neural network circuit that stores a learned weight parameter, and
    wherein the neural network circuit is configured to output, as output data, a signal selecting the super-resolution processing circuit to which the divided first image data including the target block is input, with the information of the target block being input data.

11. The display device according to claim 9, wherein the super-resolution processing circuit is configured to generate the second image data using any one of a Nearest neighbor method, a Bilinear method, a Bicubic method, a Lanczos method, an RAISR method, an ANR method, an A+ method, and an SRCNN method.

12. The display device according to claim 9, further comprising:
    an image synthesis unit generating third image data by synthesizing a plurality of the second image data; and
    a display unit which displays an image on the basis of the third image data,
    wherein the display unit comprises a pixel comprising a display element and a transistor, and
    wherein the display element is a liquid crystal element or a light-emitting element.

13. The display device according to claim 12, wherein the transistor is a bottom-gate transistor.

14. The display device according to claim 12, wherein a semiconductor layer of the transistor comprises amorphous silicon.

15. The display device according to claim 12, wherein 7600 or more of the pixels are placed in a row direction in the display unit and 4300 or more of the pixels are placed in a column direction in the display unit.

16. The display device according to claim 12, wherein the display unit has a diagonal of 60 inches or more.

* * * * *